United States Patent
Suzuki et al.

(10) Patent No.: US 9,942,640 B2
(45) Date of Patent: Apr. 10, 2018

(54) SOUND OUTPUT APPARATUS, SOUND OUTPUT METHOD AND IMAGE DISPLAY APPARATUS

(71) Applicant: SONY CORPORATION, Tokyo (JP)

(72) Inventors: Nobukazu Suzuki, Kanagawa (JP); Yoshio Ohashi, Kanagawa (JP); Masahiro Takahashi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/889,246

(22) PCT Filed: Mar. 27, 2014

(86) PCT No.: PCT/JP2014/001761
§ 371 (c)(1),
(2) Date: Nov. 5, 2015

(87) PCT Pub. No.: WO2014/184994
PCT Pub. Date: Nov. 20, 2014

(65) Prior Publication Data
US 2016/0105740 A1    Apr. 14, 2016

(30) Foreign Application Priority Data
May 15, 2013    (JP) .................. 2013-103023

(51) Int. Cl.
| | |
|---|---|
| H04R 5/02 | (2006.01) |
| H04R 1/08 | (2006.01) |
| H04R 1/02 | (2006.01) |
| H04N 5/64 | (2006.01) |
| H04R 7/04 | (2006.01) |
| H04R 1/26 | (2006.01) |
| H04R 1/40 | (2006.01) |
| H04R 5/04 | (2006.01) |

(Continued)

(52) U.S. Cl.
CPC ............... *H04R 1/028* (2013.01); *H04N 5/64* (2013.01); *H04R 1/26* (2013.01); *H04R 1/403* (2013.01); *H04R 5/02* (2013.01); *H04R 7/04* (2013.01); *H04R 1/323* (2013.01); *H04R 5/04* (2013.01); *H04R 17/00* (2013.01); *H04R 2201/025* (2013.01); *H04R 2430/03* (2013.01); *H04R 2499/11* (2013.01); *H04R 2499/15* (2013.01)

(58) Field of Classification Search
CPC ....... H04R 7/04; H04R 2499/15; H04R 17/00
USPC ......................................... 381/333, 352, 160
See application file for complete search history.

(56) References Cited

U.S. PATENT DOCUMENTS

| | | | | |
|---|---|---|---|---|
| 8,059,843 | B2* | 11/2011 | Hung ..................... | H04N 5/642 181/199 |
| 2010/0067726 | A1* | 3/2010 | Suzuki .................. | G06F 1/1605 381/333 |
| 2012/0063633 | A1* | 3/2012 | Suzuki .................... | H04R 1/24 381/423 |

FOREIGN PATENT DOCUMENTS

| | | |
|---|---|---|
| JP | 2010-93769 A | 4/2010 |
| JP | 2011-109336 A | 6/2011 |
| WO | WO 2004/023199 A1 | 3/2004 |

OTHER PUBLICATIONS

International Search Report prepared by the Japanese Patent Office dated Jun. 30, 2014, for International Application No. PCT/JP2014/001761.

* cited by examiner

*Primary Examiner* — George Monikang
(74) *Attorney, Agent, or Firm* — Sheridan Ross P.C.

(57) ABSTRACT

A sound output apparatus includes a diaphragm having a predetermined plane positioned at a rear surface side of a light provision unit, and a vibrator for providing vibration in (Continued)

a direction substantially orthogonal to the predetermined plane.

20 Claims, 21 Drawing Sheets

(51) Int. Cl.
    *H04R 1/32*     (2006.01)
    *H04R 17/00*     (2006.01)

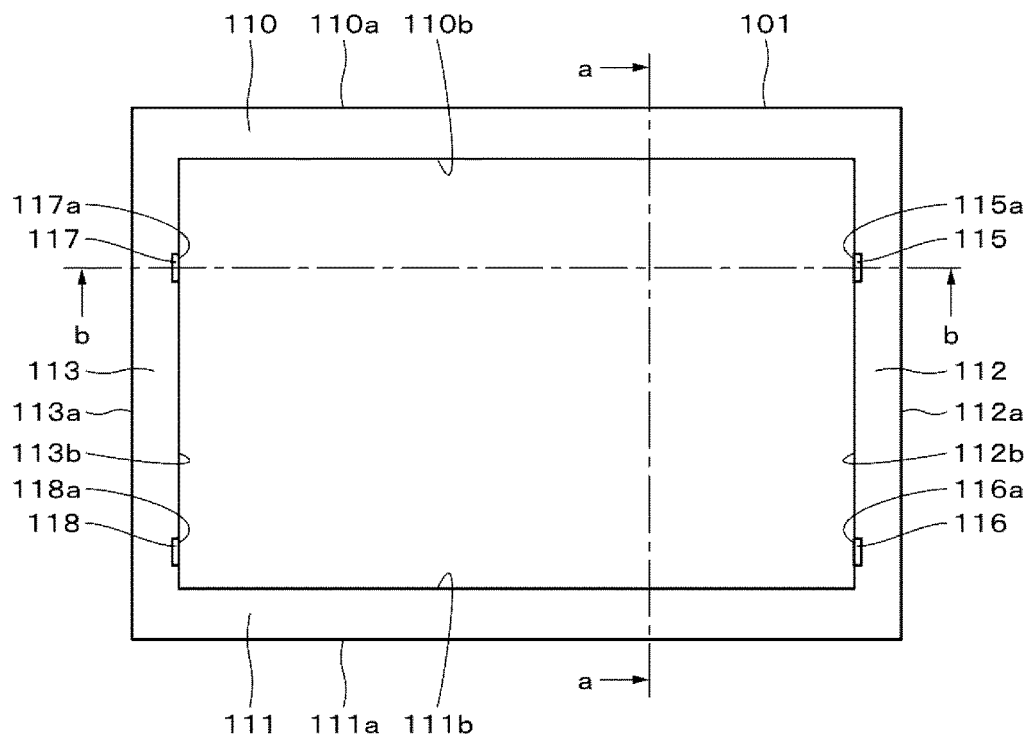
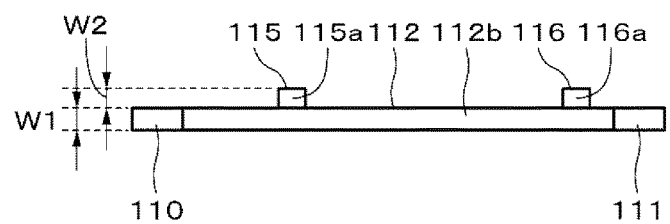
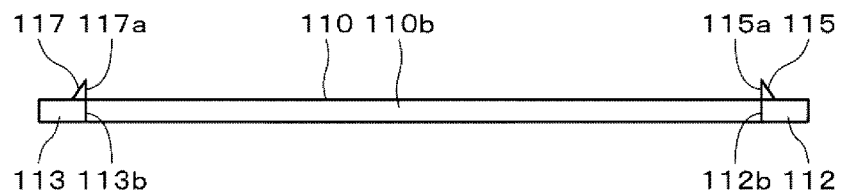
FIG.3

SOUND OUTPUT APPARATUS, SOUND OUTPUT METHOD AND IMAGE DISPLAY APPARATUS

CROSS REFERENCE TO RELATED APPLICATIONS

This application is a national stage application under 35 U.S.C. 371 and claims the benefit of PCT Application No. PCT/JP2014/001761 having an international filing date of Mar. 27, 2014, which designated the United States, which PCT application claimed the benefit of Japanese Patent Application No. 2013-103023 filed May 15, 2013, the disclosures of which are incorporated herein by reference in their entirety.

TECHNICAL FIELD

The present disclosure relates to a sound output apparatus, a sound output method and an image display apparatus.

BACKGROUND ART

A speaker apparatus for outputting a sound by vibrating a diaphragm by an actuator is proposed (for example, see Patent Document 1 below).

Patent Document 1: Japanese Patent No. 4821589

SUMMARY OF INVENTION

Problem to be Solved by the Invention

The speaker apparatus described in Patent Document 1 has a disadvantage that the actuator may be visible to a user depending on the apparatus to which the speaker apparatus is applied.

Accordingly, one of objects of the present disclosure relates to a sound output apparatus, a sound output method and an image display apparatus that can solve the above-described problem.

Means for Solving the Problem

In order to solve the above-described problem, the present disclosure provides a sound output apparatus, including:
a diaphragm having a predetermined plane positioned at a rear surface side of a light provision unit, and
a vibrator for providing vibration in a direction substantially orthogonal to the predetermined plane.

The present disclosure provides a sound output method in a sound output apparatus, including:
arranging a predetermined plane of a diaphragm at a rear surface side of a light provision unit, and
providing vibration to a direction substantially orthogonal to the predetermined plane by a vibrator.

The present disclosure provides an image display apparatus, including:
a display panel,
a diaphragm having a predetermined plane positioned at a rear surface side of a light provision unit, and
a vibrator for providing vibration in a direction substantially orthogonal to the predetermined plane.

Effect of the Invention

According to at least one embodiment, a vibrator for vibrating a diaphragm can be arranged in an adequate position. Note that the advantages described in the present specification are truly illustrative and are not limited thereto, and advantages different from the illustrative advantages may also be present.

BRIEF DESCRIPTION OF DRAWINGS

FIG. 3 A is a diagram for illustrating a configuration example of a bezel, B is a diagram for showing an example of a bezel section viewed from an a-a line, and C is a diagram for showing an example of a bezel section viewed from a b-b line.

MODES FOR CARRYING OUT THE INVENTION

Figure 1:
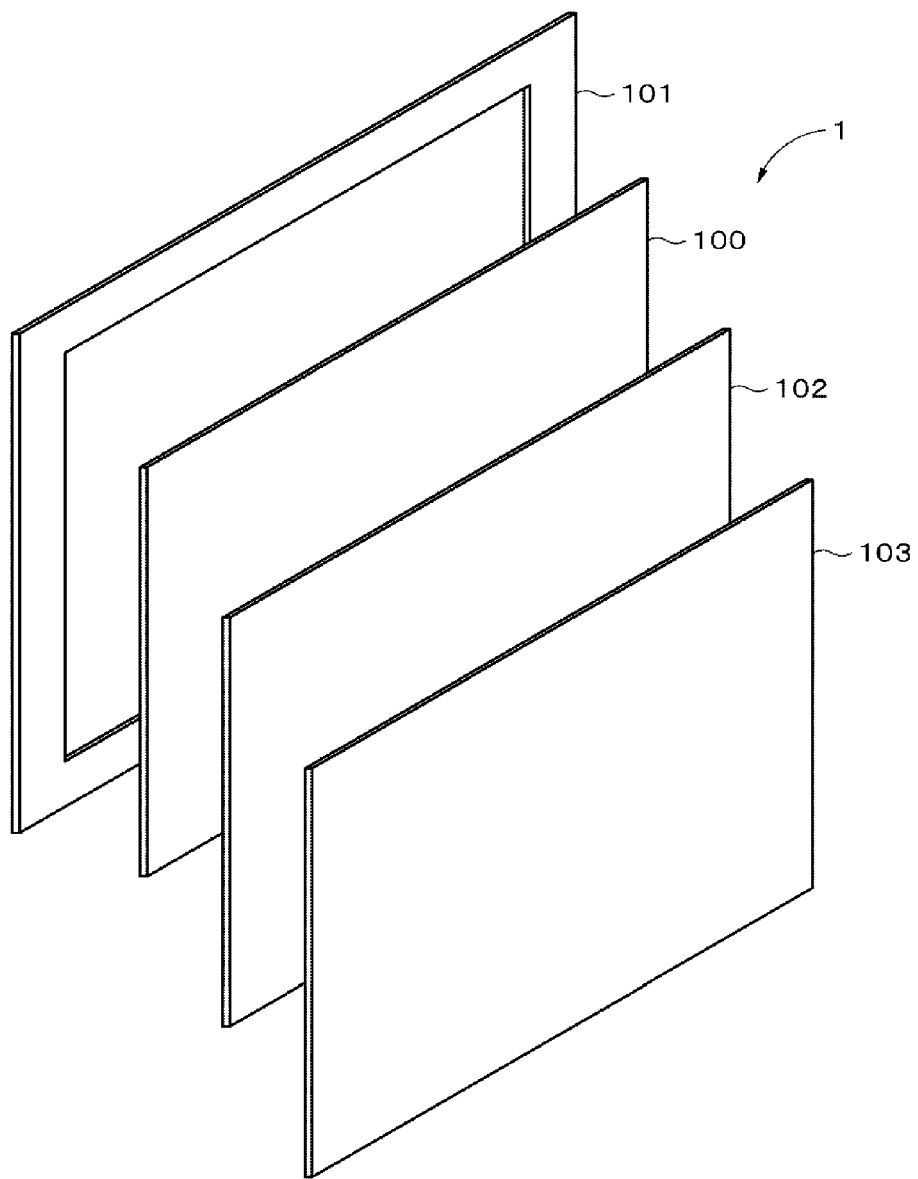
FIG. 1 A diagram for illustrating a configuration example of a part of an image display apparatus.

Hereinafter, a plurality of embodiments of the present disclosure will be described referring to the drawings. The descriptions are made in the following order.
<1. First Embodiment>
<2. Second Embodiment>
<3. Application Embodiment>
<4. Alternative Embodiment>

The various embodiments described below are preferable specific embodiments. The present disclosure should not be limited. In the following description, for explanation convenience, although there are used expression for specifying front, back, left and right directions, the directions are not limited in the present disclosure. The length, the thickness, etc. of the components in the drawings are increased or decreased as appropriate for explanation convenience.

1. First Embodiment

Configuration Example of Image Display Apparatus

The first embodiment is an example that the sound output apparatus of the present disclosure is applied to an image display apparatus. The image display apparatus is to display an image based on a television broadcasting. The image display apparatus can be used as a stationary type that the apparatus is mounted to a horizontal surface such as a floor, a rack and a board and a wall hanging type for hanging on the wall.

FIG. 1 is an exploded perspective diagram for illustrating a configuration example of a part of the image display apparatus. The image display apparatus 1 includes a display panel 100, a bezel 101, a back chassis 102, and a rear cover 103.

At the forefront of the image display apparatus 1, the display panel 100 including liquid crystal cells is disposed. A side where an image is presented to a user by the display panel 100 is called as a front surface side, and an opposite side is called as a rear surface side, as appropriate. The display panel 100 functions as a light provision unit, as an example. The light provision unit provides the user with light, and may emit light itself or emit light based on light from other light source.

Around the display panel 100, a bezel 101 having a frame plate (frame-like) shape is mounted. The bezel 101 functions as an acoustic diaphragm, for example. The bezel 101 is desirably configured of a member having excellent acoustic properties. Desirably, the bezel 101 is configured of a fireproof acrylic plate or polycarbonate, but is not limited thereto.

In addition, the bezel 101 is made of, for example, a light transmitting member, and is desirably transparent. If the bezel 101 is made of the light transmitting member, the image display apparatus 1 having excellent designability can be provided.

At a rear surface of the display panel 100, the back chassis 102 is mounted. The back chassis 102 is a substantially flat plate member covering the rear surface of the display panel 100. The back chassis 102 is made of a metal plate such as aluminum (Al).

The rear surface of the image display apparatus 1 is covered by the rear cover 103. The rear cover 103 is made of, for example, a flat plate member of a metal such as iron (Fe). The rear cover 103 covers the rear surface side of the bezel 101 and the rear surface side of the back chassis 102, and is mounted thereto.

The shapes etc. of the respective components in the image display apparatus 1 shown in FIG. 1 are simplified for shown. In addition, in FIG. 1, a screw, a screw hole, etc. for fixing the respective components in the image display apparatus 1 are omitted, as appropriate.

Figure 2:
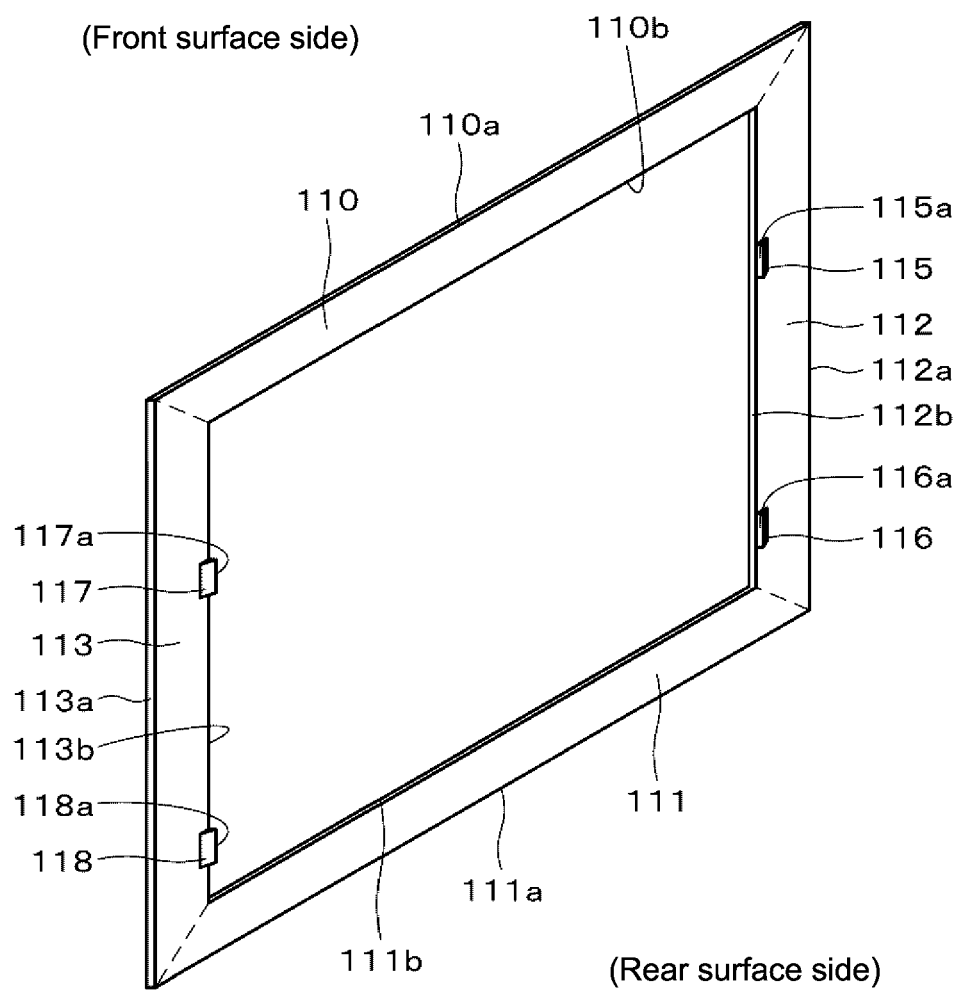
FIG. 2 A diagram for illustrating a configuration example of a bezel.

Referring to FIG. 2, the bezel 101 will be described in detail. The bezel 101 is a frame including, for example, an upper side plate 110, a lower side plate 111, a right side plate 112, and a left side plate 113. Inside of the lower side plate 111, an LED (Light Emitting Diode), an indicator and a variety of sensors may be built-in corresponding to the image display apparatus 1. Dotted lines shown in FIG. 2 represent illustrative boundaries of the respective plates, but have no special meanings.

Each plate has plate surfaces at the front surface side and the rear surface side, and an outer side surface and an inner side surface. In other words, the upper side plate 110 has an outer side surface 110a and an inner side surface 110b. The lower side plate 111 has an outer side surface 111a and an inner side surface 111b. The right side plate 112 has an outer side surface 112a and an inner side surface 112b. The left side plate 113 has an outer side surface 113a and an inner side surface 113b.

In the first embodiment, illustrative predetermined planes are the inner side surface 112b of the right side plate 112 and the outer side surface 113a of the left side plate 113. Vibrators such as a piezo actuator are mounted to, for example, the bezel 101. The vibrators provide vibration in a direction substantially orthogonal to the predetermined planes. The substantially orthogonal means not only orthogonal, but a slight deviation from orthogonal caused by the structures of the vibrator and the predetermined plane.

As the rear surface side of the bezel 101, one or more of protrusions are formed. In this embodiment, at the rear surface side of the bezel 101, four protrusions are formed. In other words, at the rear surface side of the right side plate 112, a protrusion 115 and a protrusion 116 are formed. In addition, at a rear surface side of the left side plate 113, a protrusion 117 and a protrusion 118 are formed. Each protrusion may be formed integrally with the bezel 101, and may be mounted to the bezel 101 with an adhesive etc. after each protrusion is formed separately from the bezel 101.

Each protrusion has a triangular prism shape having, for example, an end face. It should be appreciated that each protrusion have an appropriate shape. The protrusion 115 has an end face 115a. In this embodiment, the end face 115a is coplanar with the inner side surface 112b, but the protrusion 115 may be formed at around a center of the right side plate 112 such that the end face 115a is substantially parallel to the inner side surface 112b.

The protrusion 116 has an end face 116a. In this embodiment, the end face 116a is coplanar with an inner side surface 112b, but the protrusion 116 may be formed at around a center of the right side plate 112 such that the end face 116a is substantially parallel to the inner side surface 112b.

The protrusion 117 has an end face 117a. In this embodiment, the end face 117a is coplanar with an inner side surface 113b, but the protrusion 113 may be formed at around a center of the right side plate 113 such that the end face 117a is substantially parallel to the inner side surface 113b.

The protrusion 118 has an end face 118a. In this embodiment, the end face 118a is coplanar with an inner side surface 113*b*, but the protrusion 118 may be formed at around a center of the right side plate 113 such that the end face 118*a* is substantially parallel to the inner side surface 113*b*.

FIG. 3A is a diagram of the bezel 101 viewed from the rear surface side. FIG. 3B is a diagram of the bezel 101 cut on an a-a line and viewed from an arrow. FIG. 3C is a diagram of the bezel 101 cut on a b-b line and viewed from an arrow.

As shown in FIG. 3B, on a plate surface at the rear surface side of the right side plate 112 of the bezel 101, the protrusion 115 and the protrusion 116 are formed. A width (a length at a shorter direction) W1 of the inner side surface 112*b* of the right side plate 112 is set to, for example, about 3 mm (millimeters) to about 5 mm.

A width of each end face of each protrusion (the end face 115*a* of the protrusion 115 and the end face 116*a* of the protrusion 116) W2 is set to the similar to that of the inner side surface 112*b* is set to (for example, about 3 mm to about 5 mm). The size of the width W2 may be different from the size of the width W1. Although the details are described later, a contact surface of the actuator is in contact with the end face of each protrusion. Accordingly, the size of the end face is set to be greater than the size of the contact surface of the actuator.

As shown in FIG. 3C, the protrusion 115 is formed on a plate surface at a rear surface side of the right side plate 112 of the bezel 101. The protrusion 117 is formed on a plate surface at a rear surface side of the left side plate 113 of the bezel 101. As described above, each protrusion has, for example, a triangular prism shape, but is not limited thereto. In this embodiment, the end face 115*a* of the protrusion 115 and the inner side surface 112*b* of the right side plate 112 are set coplanar. In addition, the end face 117*a* of the protrusion 117 and the inner side surface 113*b* of the left side plate 113 are set coplanar.

Figure 4:
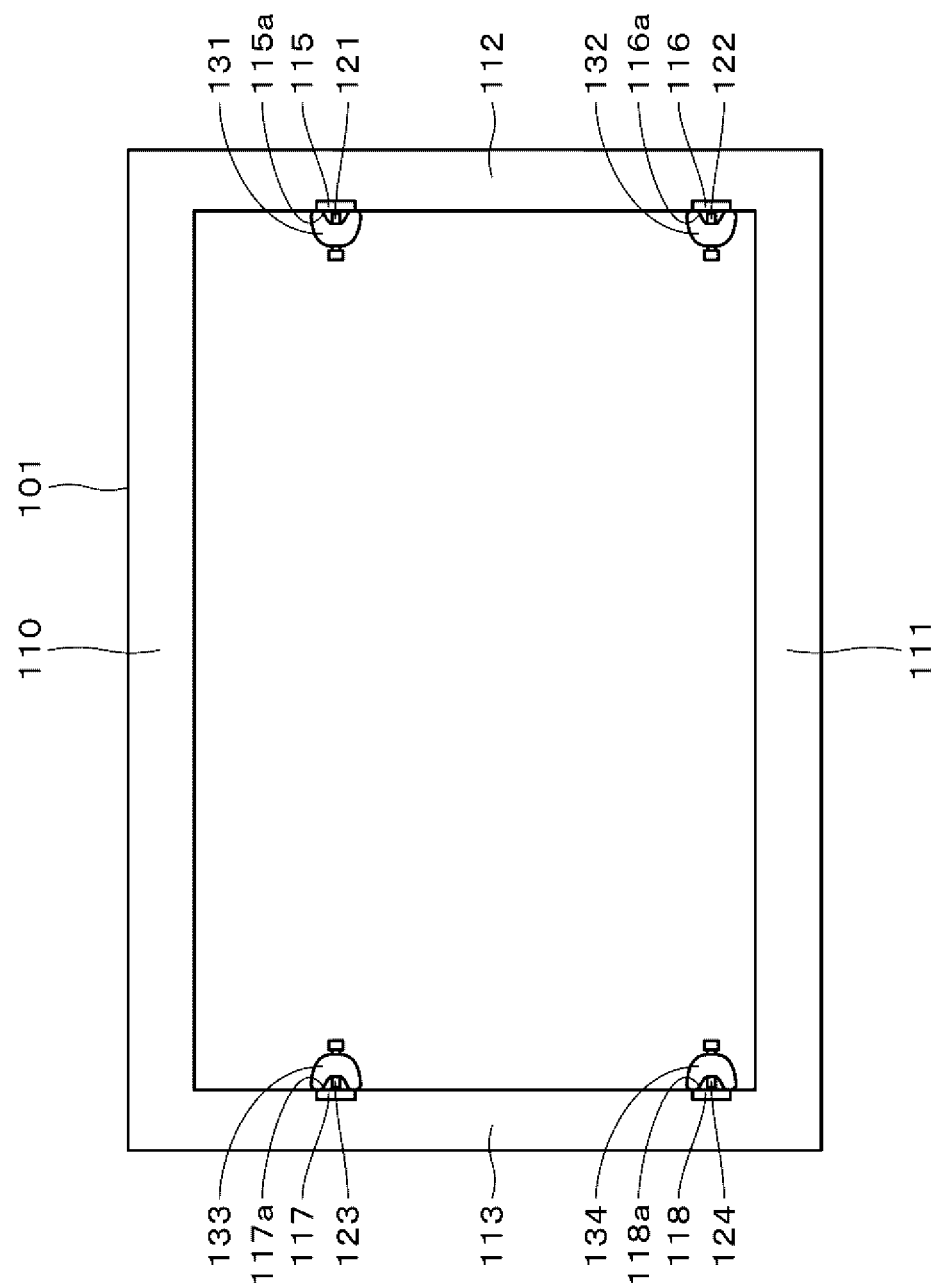
FIG. 4 A diagram for illustrating a configuration example of a bezel and a configuration example of an actuator mounted to the bezel.

One or more vibrators are mounted to the bezel 101. The vibrator is, for example, a piezo actuator that is inexpensive and small-sized is used. It should be appreciated that other type such as a magnetostrictive actuator may be used. For example, as shown in FIG. 4, corresponding to the numbers of the protrusions formed at the bezel 101, four actuators (actuators 121, 122, 123, 124) are mounted to the bezel 101. Each actuator is mounted to the bezel 101 via a mounting mechanism such as a screw. Corresponding to the actuators, four mounting mechanisms (mounting mechanisms 131, 132, 133, 134) are mounted to the bezel 101.

For example, the mounting mechanism 131 is mounted around the protrusion 115 of the bezel 101, and supports the actuator 121. The mounting mechanism 131 supports the actuator 121 such that the contact surface of the actuator 121 is in contact with the end face 115*a* of the protrusion 115.

For example, the mounting mechanism 132 is mounted around the protrusion 116 of the bezel 101, and supports the actuator 122. The mounting mechanism 132 supports the actuator 122 such that the contact surface of the actuator 122 is in contact with the end face 116*a* of the protrusion 116.

For example, a mounting mechanism 133 is mounted around the protrusion 117 of the bezel 101, and supports the actuator 123. The mounting mechanism 133 supports the actuator 123 such that the contact surface of the actuator 123 is in contact with the end face 117*a* of the protrusion 117.

For example, the mounting mechanism 134 is mounted around the protrusion 118 of the bezel 101, and supports the actuator 124. The mounting mechanism 134 supports the actuator 124 such that the contact surface of the actuator 124 is in contact with the end face 118*a* of the protrusion 118.

Figure 5:
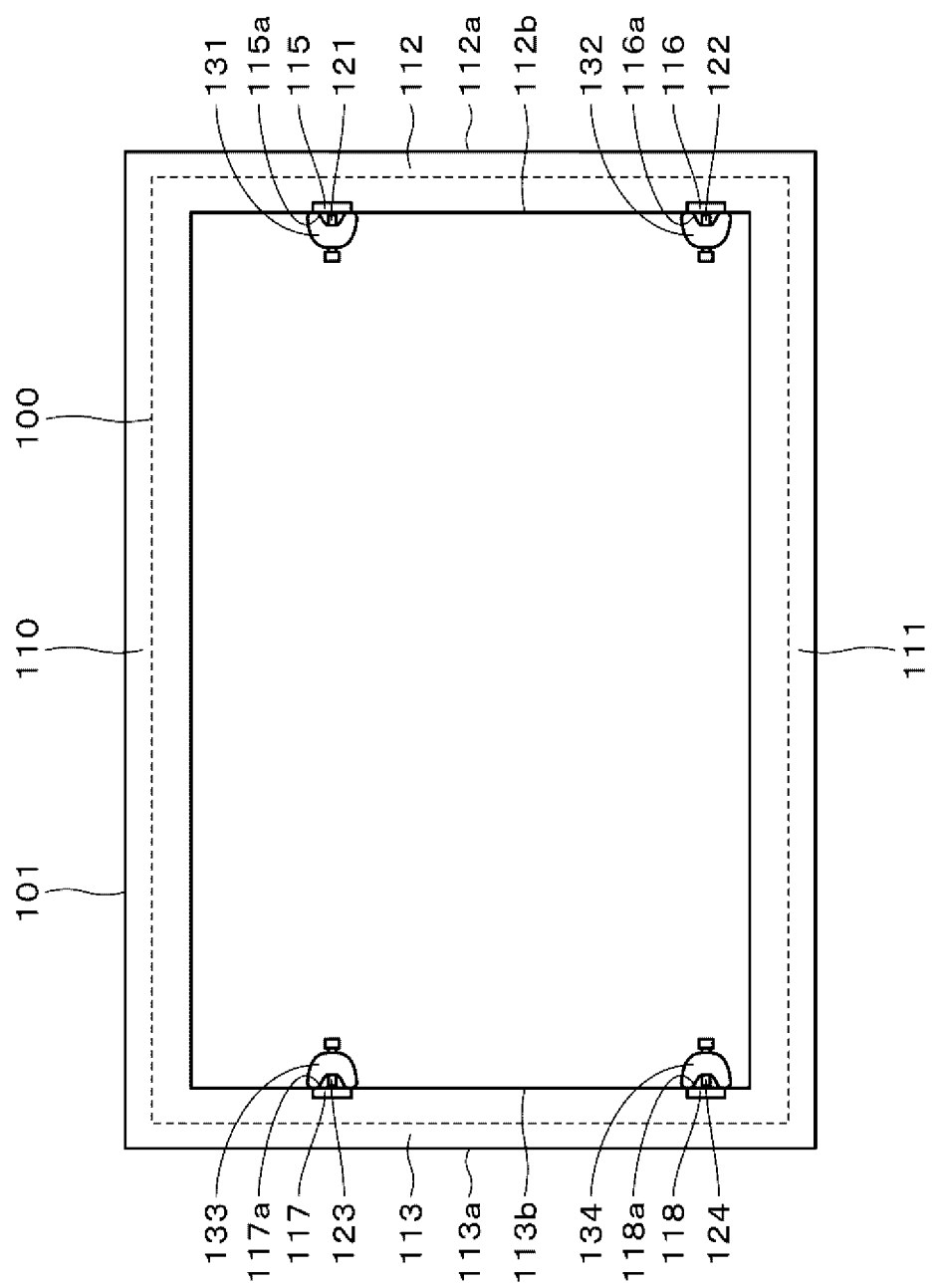
FIG. 5 A diagram for illustrating an example of a positional relationship between a display panel and an actuator.

A dotted line shown in FIG. 5 represents an illustrative position of the display panel 100 supported by the bezel 101. If the image display apparatus 1 is viewed from the front surface side, the inner side surface 112*b* and the inner side surface 113*b* are positioned at the rear surface side of the display panel 100. In other words, the inner side surface 112*b* and the inner side surface 113*b* of the bezel 101 are positioned at a region where the image display apparatus 1 is not visible by the user (invisible region). Furthermore, the actuator and the mounting mechanism of the actuator that provide vibration in a direction substantially orthogonal to the inner side surface 112*b* and the inner side surface 113*b* are positioned at the rear surface side of the display panel 100.

Here, it may be possible that the bezel 101 is vibrated by mounting a vibrating device such as the actuator on the plate surface at the rear surface side of the bezel 101 and vibrating the vibrating device in an assumption technology (not related art). However, if the bezel 101 is configured of, for example, a transparent member, the actuator mounted to the plate surface of the bezel 101 is visible to the user, which is undesirable in terms of a design. In this embodiment, as the actuators and the mounting mechanisms of the actuators are positioned at the rear surface side of the display panel 100, the actuators and the mounting mechanisms of the actuators are prevented from viewing by the user. In other words, the image display apparatus 1 having an excellent designability can be provided.

Figure 6:
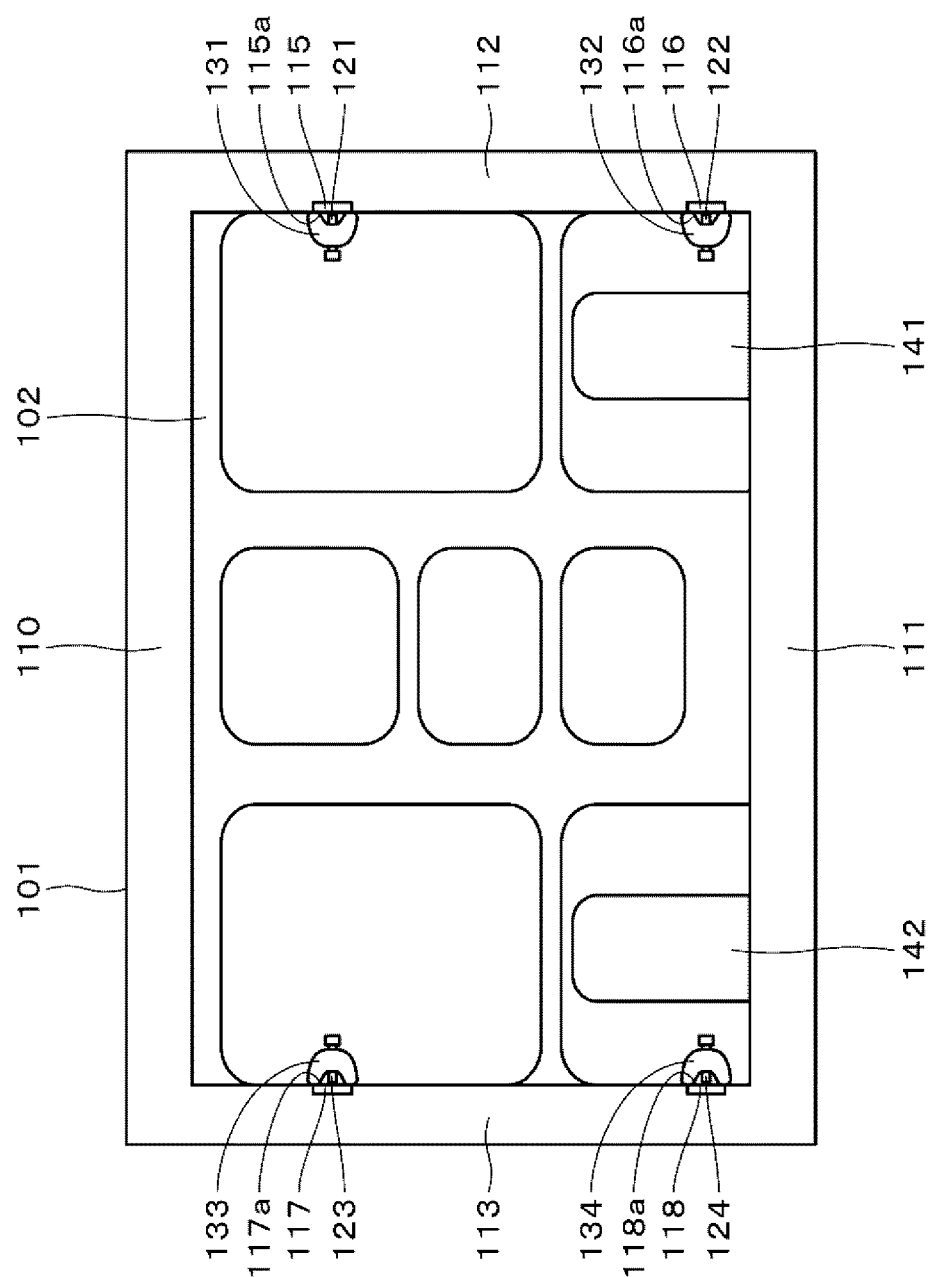
FIG. 6 A diagram for illustrating a configuration example of an image display apparatus viewed from a rear surface with a rear cover being removed.

As described above, the back chassis 102 is mounted at the rear surface of the display panel 100. FIG. 6 shows a configuration example of the image display apparatus 1 viewed from the rear surface with the rear cover 103 being removed. To the back chassis 102, a circuit substrate, etc. is mounted. In FIG. 6, the circuit substrate, etc. is omitted, as appropriate.

At the rear surface side of the back chassis 102 (the same side of the rear surface side of the display panel 100), speakers as illustrative sound output units are mounted. For example, an L channel speaker 141 and an R channel speaker 142 are mounted at the rear surface of the back chassis 102.

Figure 7:
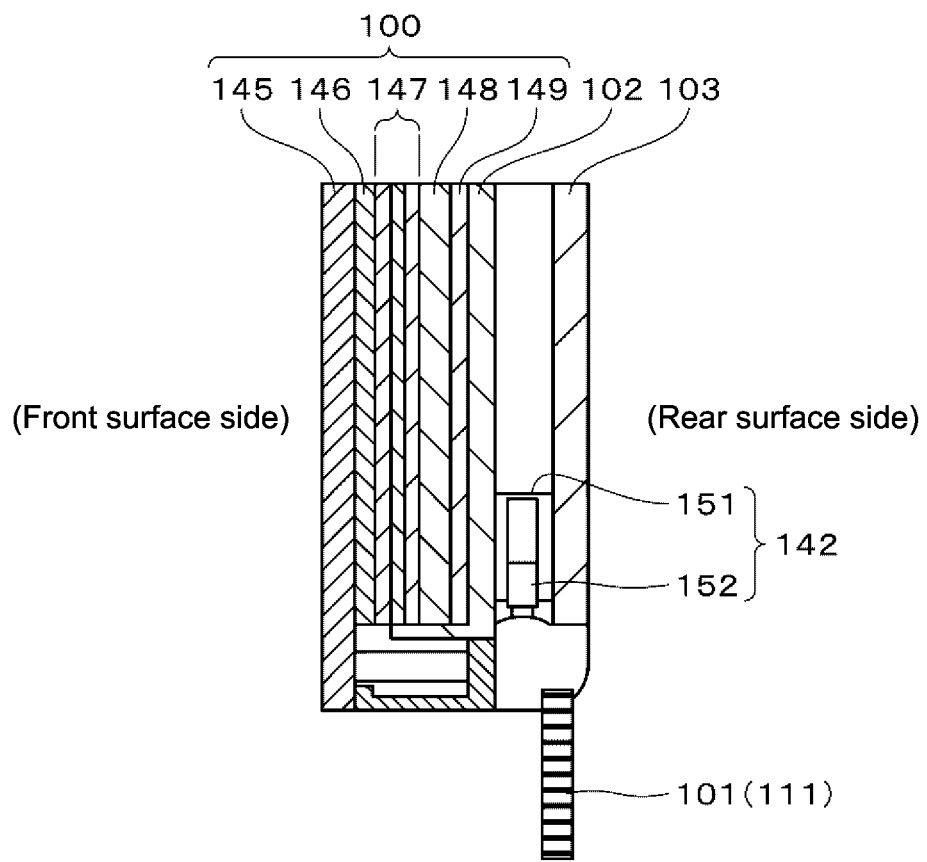
FIG. 7 A diagram for illustrating a configuration example of an image display apparatus viewed from a side surface.

FIG. 7 shows a configuration example of the image display apparatus 1 viewed from a side surface (for example, the outer side surface 113*a* of the left side plate 113). At the front surface side of the image display apparatus 1, the display panel 100 is arranged. The display panel 100 includes, from the forefront, for example, a front glass 145, a cell 146 having a liquid crystal layer (omitted in the figure), an optical sheet such as a diffuser plate 147, a light guide plate 148, and a reflector plate 149. It should be appreciated that the configuration may be different depending on the configuration of the image display apparatus 1.

At the rear surface side of the display panel 100, the back chassis 102 is mounted. At the rear surface side of the back chassis 102, the speaker 142 is mounted. The speaker 142 includes, for example, a speaker box 151 and a speaker main body 152. The speaker box 151 is, for example, a metal box, houses the speaker main body 152, and supports the speaker main body 152 under a predetermined state. The speaker box 151 vertically supports, for example, the speaker main body 152. In this way, the image display apparatus 1 can be thin.

The speaker main body 152 is configured of a compact dynamic speaker, and has a box shape having cut corners. It should be appreciated that the speaker main body 152 may have other shape, as appropriate. Sound emitting holes of the speaker main body 152 are faced downward. Thus, the sound is regenerated from the speaker main body 152 to the lower side plate 111 of the bezel 101. The speaker 141 has the configuration similar to, for example, the speaker 142. Note that the sound includes a variety of "sounds" heard by human ears such as a human voice and a music. At the rear surface side of the back chassis 102, the rear cover 103 is mounted.

If the image display apparatus 1 is used as a wall hanging type, a wall section is arranged at the rear surface side of the rear cover 103. A distance between the bezel 101 and a wall surface of the wall section is set to be, for example, 2 mm to 5 mm.

Configuration Example of Piezo Actuator

Figure 8:
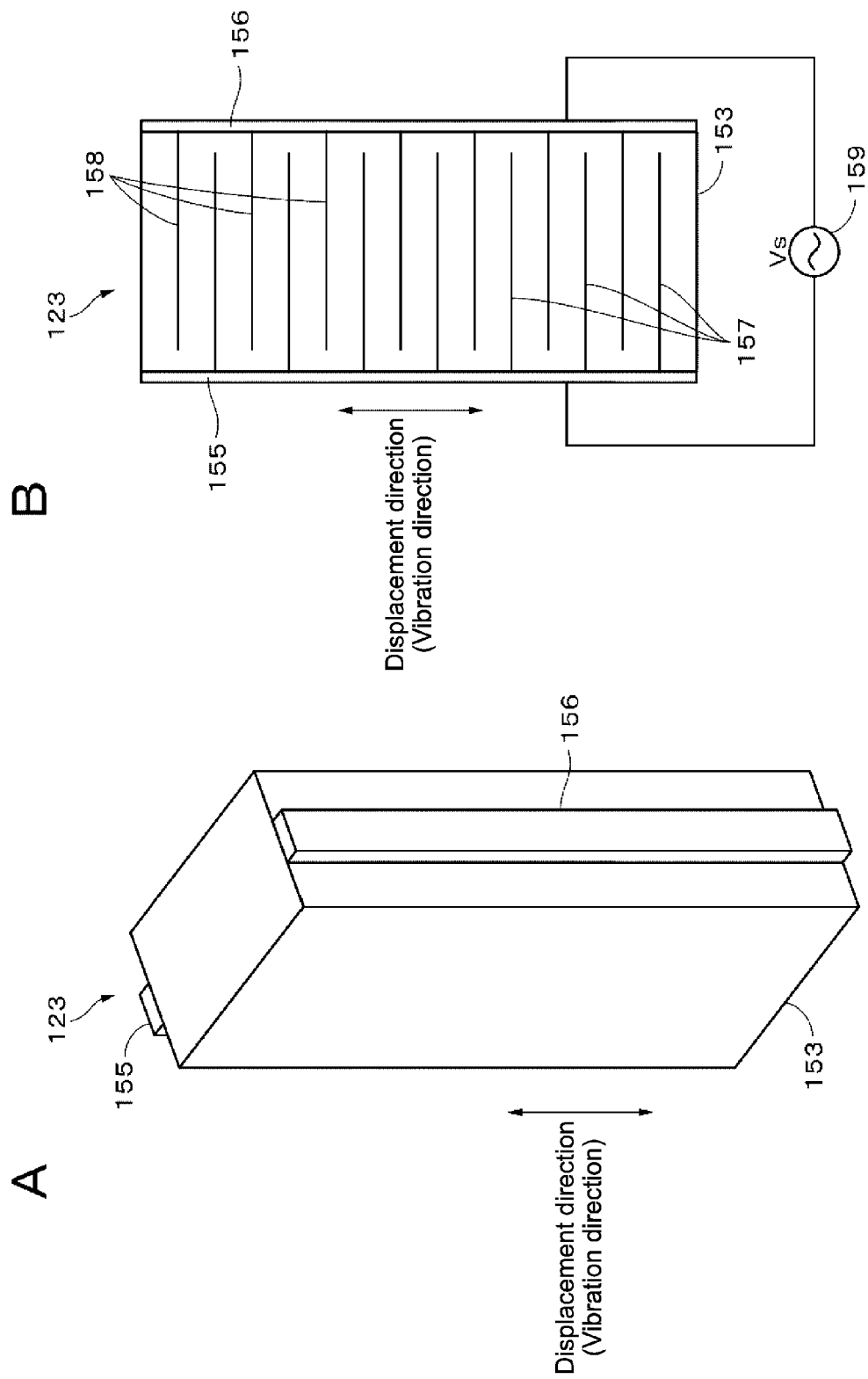
FIGS. 8 A and B each is a diagram for illustrating a configuration example of an actuator.

Referring to FIG. 8, a configuration example of the actuator 123 will be described. The configurations of other actuators including the actuator 121 are the same as that of the actuator 123. The actuator 123 is configured of, for example, a laminated piezo actuator.

FIG. 8A is a schematic perspective view of the actuator 123. FIG. 8B is a schematic cross-sectional view of the actuator 123. As shown in FIG. 8A, the actuator 123 includes, for example, a piezoelectric ceramic thin plate laminate 153 having an approximately parallelopiped shape including two end faces and four side surfaces. One of the two end faces of the piezoelectric ceramic thin plate laminate 153 functions as the contact surface. At the two side surfaces facing each other among the four side surfaces, an external electrode 155 and an external electrode 156 are formed.

The size of the end face of the piezoelectric ceramic thin plate laminate 153 is, for example, about 2 mm×2 mm. The length of the piezoelectric ceramic thin plate laminate 153 (the length of the side surface in the longitudinal direction) is, for example, about 18 mm.

As shown in FIG. 8B, inside of the piezoelectric ceramic thin plate laminate 153, internal electrodes 157 and internal electrodes 158 are alternately laminated, and a number of piezoelectric ceramic thin plates (omitted in the figure) are laminated. The internal electrodes 157 are connected to the external electrode 155. The internal electrodes 158 are connected to the external electrode 156.

If a signal voltage Vs supplied from a signal source 159 is applied between the external electrode 155 and the external electrode 156, a number of the piezoelectric ceramic thin plates inside of the piezoelectric ceramic thin plate laminate 153 is displaced in a thickness direction. The actuator 123 is displaced and is vibrated in the lamination direction for a sum of the respective displacements.

The piezo actuator needs no magnetic bias different from the magnetostrictive actuator, thereby making the actuator 123 simpler and smaller. In addition, the piezo actuator has advantages of a great initial stress and a high response speed.

Example of Mounting Actuator

Figure 9:
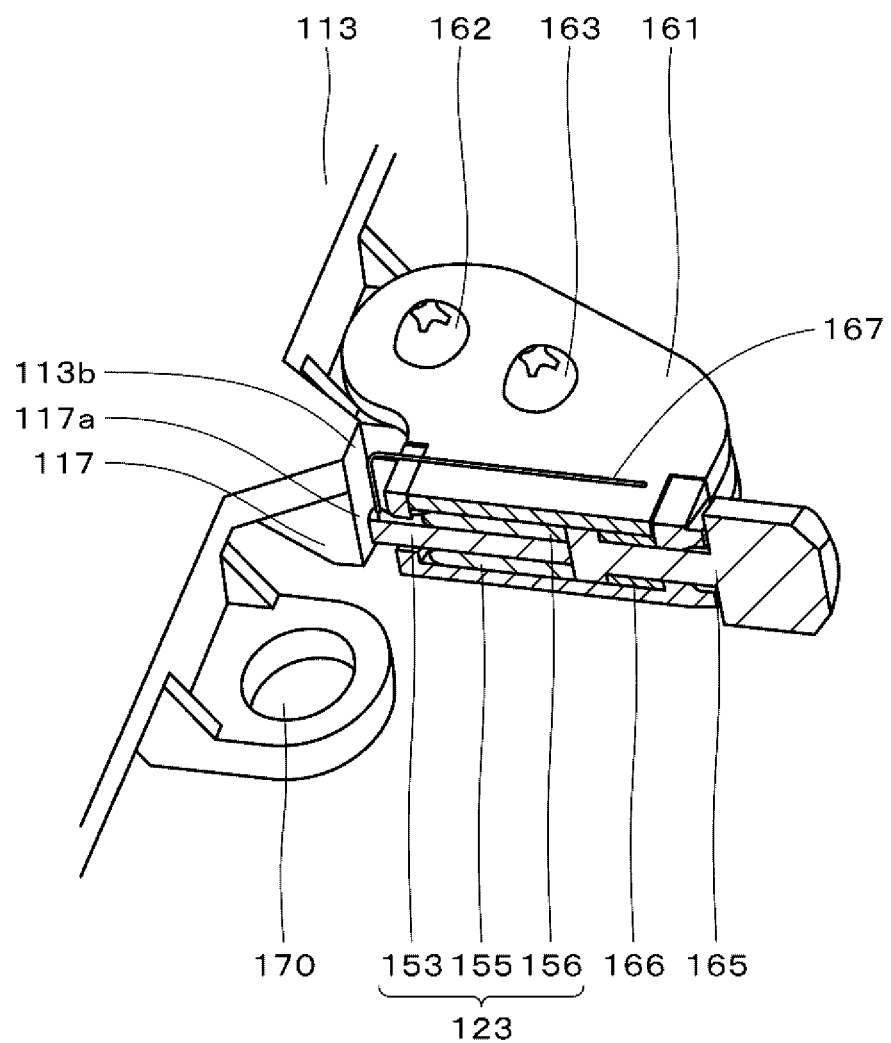
FIG. 9 A diagram for illustrating a configuration example of a mounting mechanism of an actuator.

Referring to FIG. 9, an example of mounting the actuator 123 will be described. Note that a method of mounting other actuators including the actuator 121 is substantially similar to that of the actuator 123.

The actuator 123 is mounted to the bezel 101 by the mounting mechanism 133. The mounting mechanism 133 includes a holder 161. The holder 161 is mounted to a mounting hole at the left side plate 113 of the bezel 101 using a screw 162 and a screw 163, etc. The holder 161 is made of, for example, an ABS resin.

Note that in FIG. 9, for showing inside (section) of the holder 161, the holder is partly omitted in the figure. For example, a holder having a shape substantially symmetrical to the holder 161 is mounted to the mounting hole 170, and is configured integrally with the holder 161.

The actuator 123 is housed and held within the holder 161. One end face of the piezoelectric ceramic thin plate laminate 153 of the actuator 123 is in contact with the end face 117a of the protrusion 117. In this way, the vibration of the piezo actuator 123 is transmitted to the bezel 101.

One end face of the piezoelectric ceramic thin plate laminate 153 of the actuator 123 is in contact with the locking member 165. In addition, a predetermined load is applied to the actuator 123 by a coil spring 166. In other words, a locking member 165 and the coil spring 166 allow the actuator 123 to be held within the holder 161 with shrunk by the load.

The locking member 165 functions as a sound earth, and contributes to a sound quality and a sound pressure. As the locking member 165, for example, brass having a great specific weight and providing a pleasant sound is used. It should be appreciated that a member other than brass can be applied to the locking member 165 depending on a target sound quality. Furthermore, anything other than the coil spring can be used as long as it applies a load to the actuator 123.

A signal line 167 is connected to the external electrode 155 and the external electrode 156. A predetermined sound signal is supplied to the actuator 123 via the signal line 167. Depending on the sound signal supplied, the actuator 123 is vibrated. By operating the actuator 123, a vibration in a direction substantially orthogonal to the end face 117a is provided. The vibration by the actuator 123 is transmitted to the bezel 101 via the end face 117a, and the bezel 101 is vibrated.

"Regeneration of Sound Signal"

Figure 10:
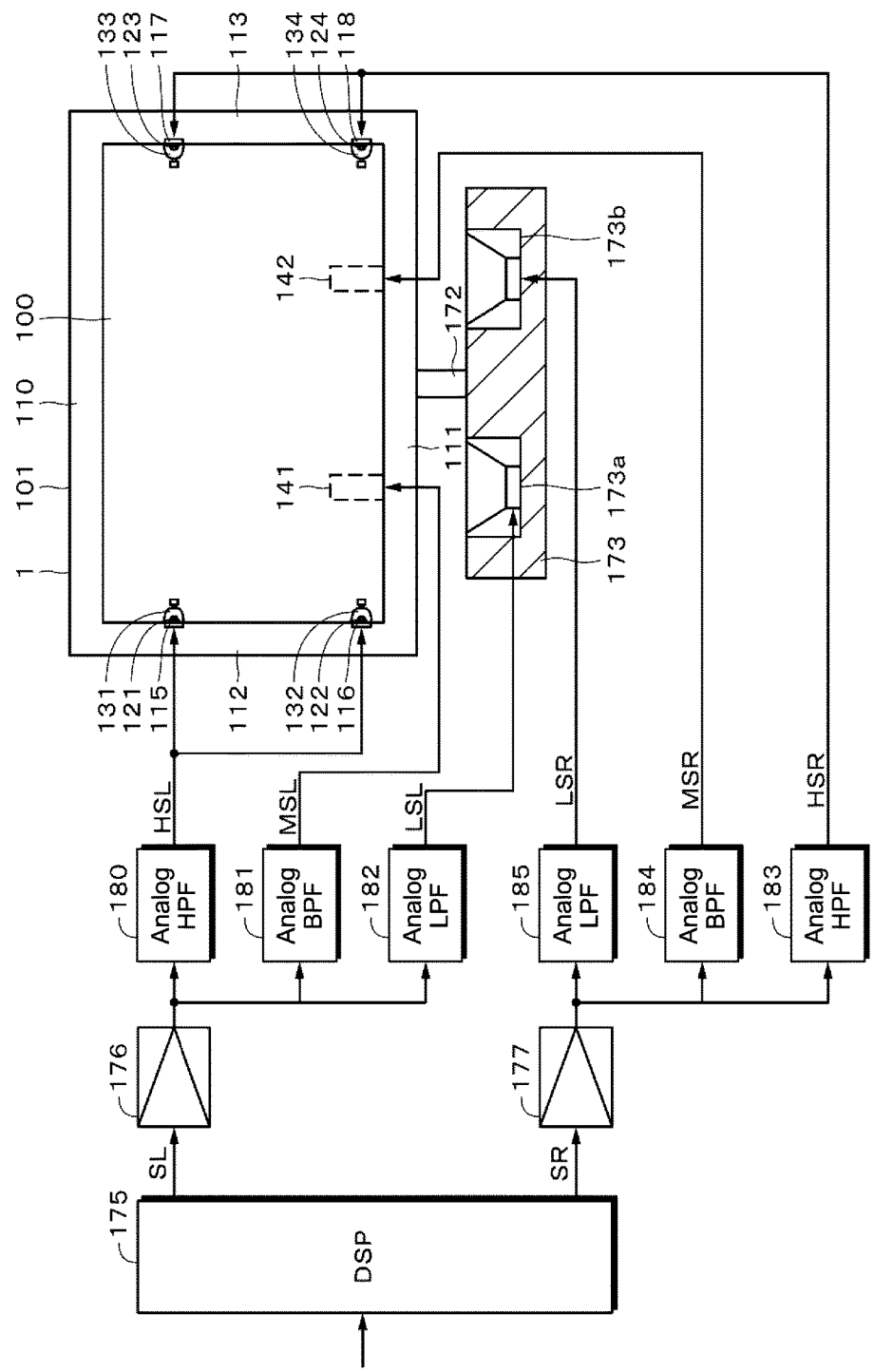
FIG. 10 A diagram for illustrating a configuration example of an acoustic system.

Referring to FIG. 10, an example of regenerating a sound signal by the image display apparatus 1 will be described. Although the actuator 123 and the like are shown in solid lines in FIG. 10 for explanation convenience, these components are positioned at a rear surface side of the display panel 100, and are actually invisible.

In this embodiment, the image display apparatus 1 is mounted to a seat box 173 by a support rod 172. The image display apparatus 1 and the seat box 173 construct an acoustic system. The seat box 173 includes an L channel speaker 173a and an R channel speaker 173b. The speaker 173a and speaker 173b each is a general speaker having a voice coil and a cone, and a front surface of the speaker is directed to substantially upward.

To a DSP (Digital Signal Processor) 175, a sound signal (for example, a stereo sound signal) is supplied. To the DSP 175, the sound signal may be supplied from an optical recording medium, a semiconductor memory, or via a network. The DSP 175 applies digital sound signal processing such as frequency correction to a stereo sound signal supplied. After the digital sound signal processing is applied by the DSP 175, the DSP 175 performs processing to convert a digital sound signal into an analog sound signal. By the processing, an analog sound signals, i.e., a left channel sound signal SL and a right channel sound signal SR, are provided.

The sound signal SL is supplied to a sound signal amplifier circuit 176. After the sound signal amplifier circuit 176 amplifies the sound signal SL, the sound signal SL is supplied to an analog high pass filter (HPF) 180, an analog band pass filter (BPF) 181 and an analog low pass filter (LPF) 182. By the analog HPF 180, the analog BPF 181 and the analog LPF 182, the sound signal SL is separated into a high band component sound signal HSL, a middle band component sound signal MSL and a low band component sound signal LSL.

The sound signal HSL is supplied to the actuator 121 and the actuator 122. The actuator 121 and the actuator 122 are vibrated depending on the sound signal HSL. The vibrations by the actuator 121 and the actuator 122 are transmitted to the bezel 101, and the bezel 101 is vibrated.

The sound signal MSL is supplied to the speaker 141. Then, a sound based on the sound signal MSL is regenerated from the speaker 141.

The sound signal LSL is supplied to the speaker 173a. Then, a sound based on the sound signal LSL is regenerated from the speaker 173a.

The sound signal SR is supplied to the sound signal amplifier circuit 177. After the sound signal SR is amplified by the sound signal amplifier circuit 177, the sound signal SR is supplied to an analog HPF 183, an analog BPF 184 and an analog LPF 185. By the analog HPF 183, the analog BPF 184 and the analog LPF 185, the sound signal SR is separated into a high band component sound signal HSR, a middle band component sound signal MSR and a low band component sound signal LSR.

The sound signal HSR is supplied to the actuator 123 and the actuator 124. The actuator 123 and the actuator 124 are vibrated corresponding to the sound signal HSR. The vibrations by the actuator 123 and the actuator 124 are transmitted to the bezel 101, and the bezel 101 is vibrated.

The sound signal MSR is supplied to the speaker 142. Then, a sound based on the sound signal MSR is regenerated from the speaker 142.

The sound signal LSR is supplied to the speaker 173b. Then, a sound based on the sound signal LSR is regenerated from the speaker 173b.

Thus, the image display apparatus 1 outputs a high band sound that is an example of the first sound signal by vibrating the bezel 101. The middle band sound that is an example of the second sound signal is outputted from the speaker mounted to the image display apparatus 1. The low band sound is outputted from a speaker separately disposed from the image display apparatus 1. It should be appreciated that a speaker for regenerating the low band sound may be mounted to the image display apparatus 1. High, middle and low bands can be set separately, as appropriate. The respective bands may be different or may be partly overlapped.

Figure 11:
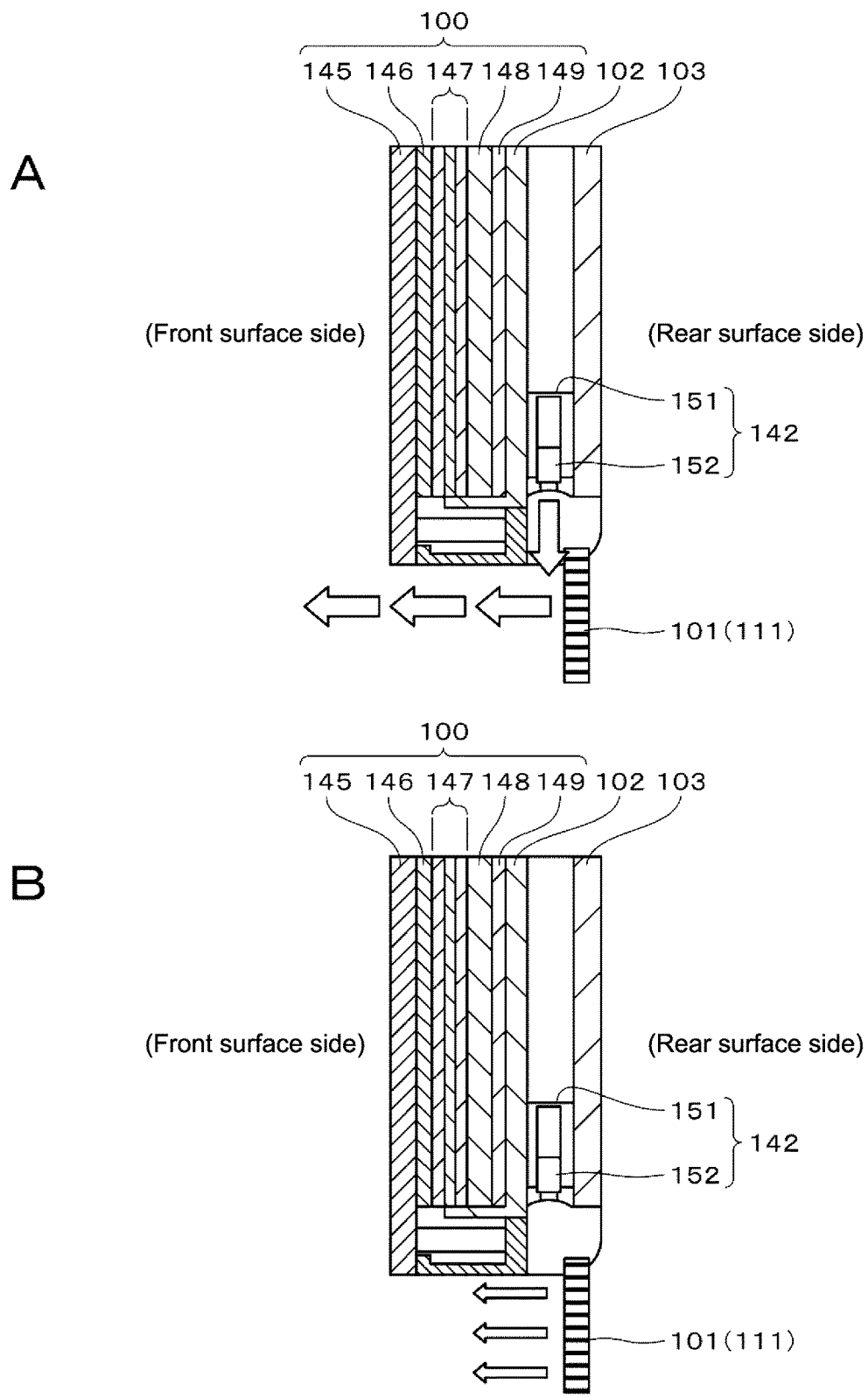
FIG. 11 A is a diagram for illustrating a regeneration of a middle band sound, and B is a diagram for illustrating a regeneration of a high band sound.

The sound outputted from the speaker 141 and the speaker 142 is outputted downward. However, as schematically shown in FIG. 11A, by functioning the lower side plate 111 of the bezel 101 as a reflector plate, it is capable of preventing a sound (acoustic wave) outputted from the speaker 141 and the speaker 142 from directing to the rear surface side of the image display apparatus 1. In other words, the bezel 101 is configured such that the sound regenerated by the speaker 141 and the speaker 142 is reflected to the front side of the display panel 100.

By functioning the bezel 101 as the diaphragm, a high band sound signal can be regenerated. The whole bezel 101 is relatively uniformly vibrated and an acoustic wave is generated so that the high band sound is spread overall and oriented. FIG. 11B schematically shows the acoustic wave generated by the vibration of the bezel 101. Alternatively, the speaker box 151 may tilt and support the speaker main body 152 to the lower side plate 111 such that the sound is regenerated from the speaker main body 152 to the lower side plate 111.

Here, if the image display apparatus 1 is a wall hanging type, the wall section is present at the rear surface side of the image display apparatus 1. Even if the image display apparatus 1 is the stationary type, the image display apparatus 1 is generally positioned at the wall. Thus, the wall section is often present at the rear surface side of the image display apparatus 1, and the rear surface side of the bezel 101 is generally adjacent to the wall section. Accordingly, an opposite phase acoustic wave generated at the rear surface side of the bezel 101 by the vibration of the bezel 101 does not appear at the front surface side, does not interfere with the acoustic wave at the front surface side and does not provide an acoustical negative impact.

Figure 12:
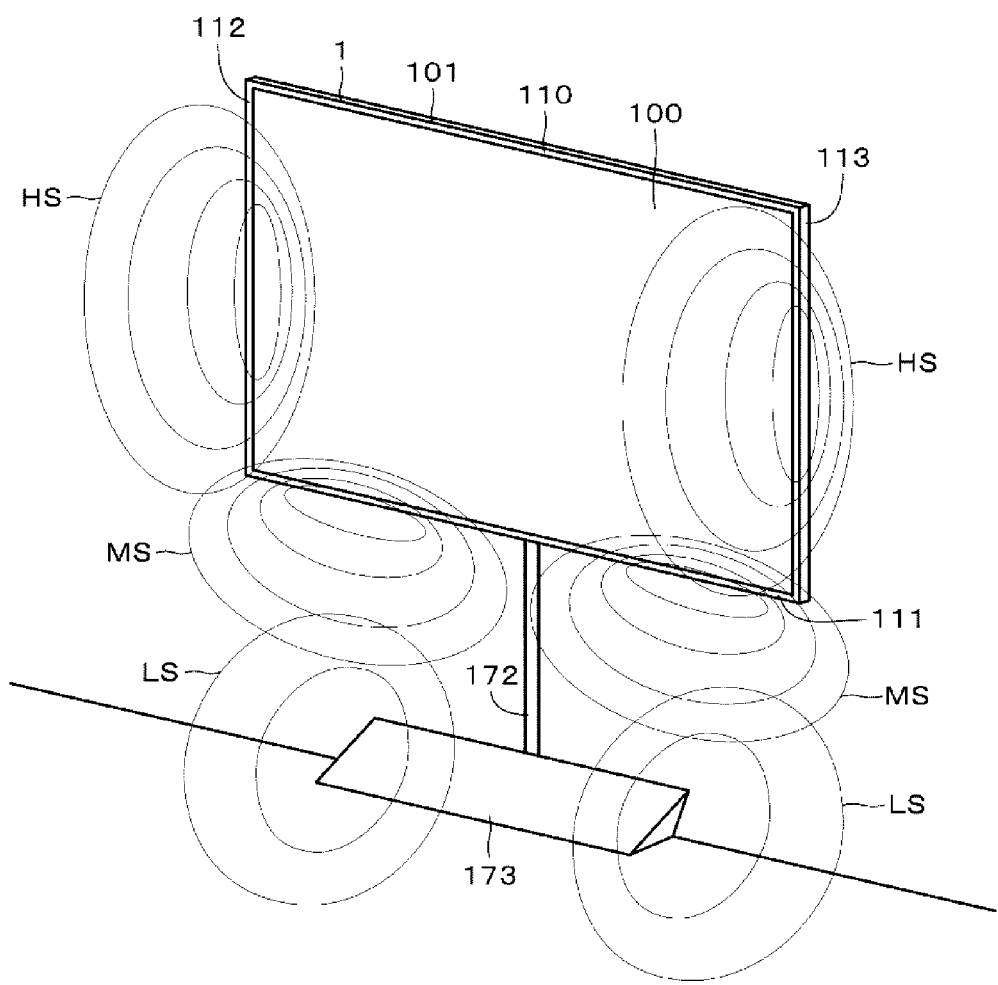
FIG. 12 A diagram schematically showing an appearance of an acoustic system and a voice regenerated by the acoustic system.

FIG. 12 schematically shows an appearance of the acoustic system and the voice regenerated by the acoustic system. By vibrating the bezel 101 of the image display apparatus 1, a high band sound HS is regenerated. The speaker of the image display apparatus 1 regenerates a middle band sound MS, the sound MS is reflected by the lower side plate 111 of the bezel 101, and the sound MS is regenerated at the front surface side of the image display apparatus 1. A low band sound LS is regenerated by the speaker in the seat box 173. In addition to the illustrated configuration, the acoustic system may include a subwoofer speaker or the like.

"Advantage Based on Difference in Vibration Position"

In the present disclosure, a vibration position is set to the end face of the protrusion. In other words, the actuator is in contact with the end face of the protrusion to vibrate the end face of the protrusion by the actuator.

Figure 13:
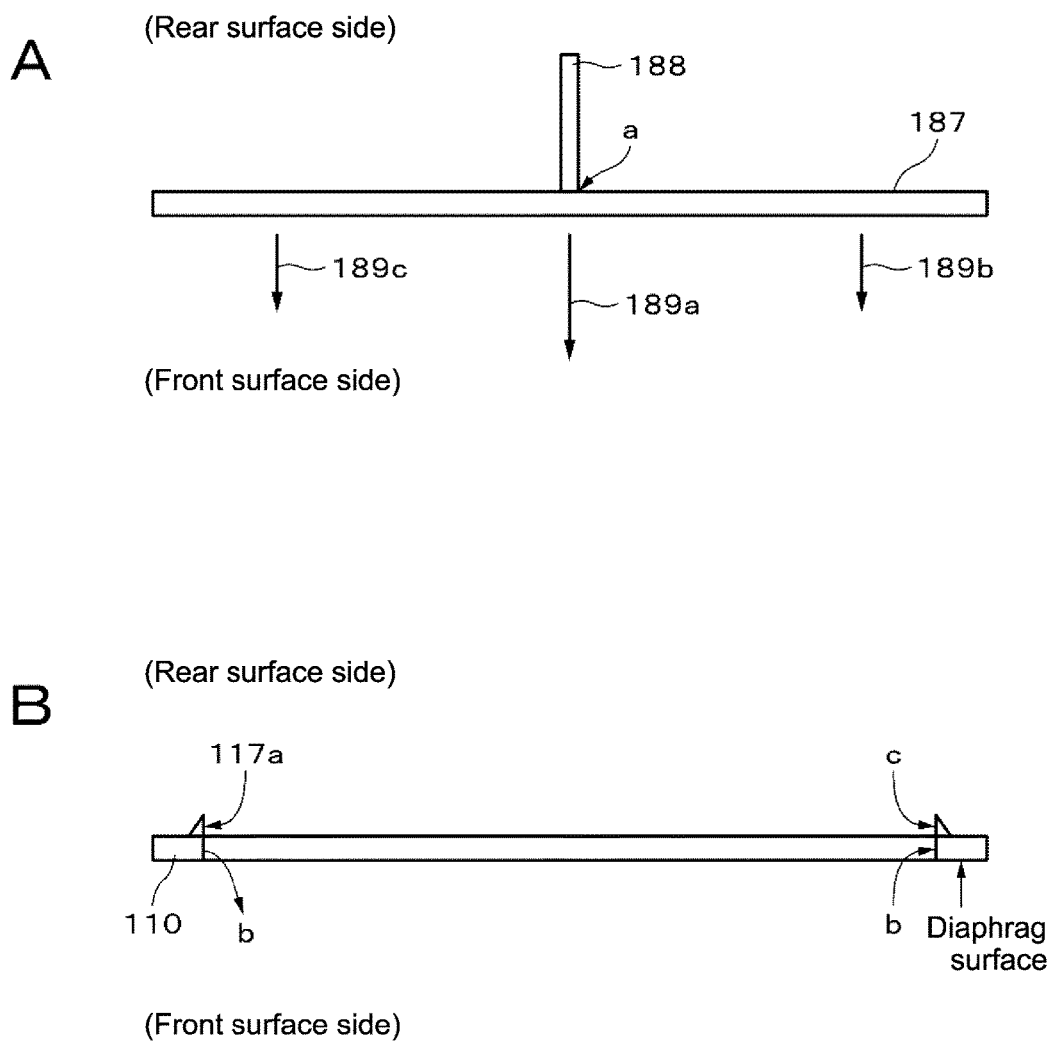
FIGS. 13 A and B each is a diagram for illustrating a difference in a sound pressure based on a difference in a vibration position.

Here, if the bezel functioning as the diaphragm is the flat plate member, as shown in FIG. 13A, the vibration position may be around center (point a) at the rear surface side of a flat plate bezel 187. In other words, an actuator 188 is in contact with the flat plate bezel 187 around the center of the plate surface at the rear surface side thereof such that a displacement direction is perpendicular to the plate surface to vibrate the actuator 188.

In this case, as shown by an arrow 189a, a vibration amplitude is increased to the maximum at a center of the bezel 187, but as shown by an arrow 189b and an arrow 189c, the vibration amplitude of the places distant from the vibration position is decreased. As the vibration position is a point sound source, the bezel 187 is undesirably not vibrated uniformly overall. In addition, if the bezel 187 is a transparent member, the actuator, etc. is visible to the user, which is undesirable in terms of a design.

On the other hand, as shown in FIG. 13B, the actuator may be in contact with an inner side surface (point b) of the bezel 101 to vibrate the bezel in a direction substantially perpendicular to the inner side surface. In this case, the vibration position is a surface sound source, the bezel 101 can be relatively uniformly and overall vibrated, and a uniform level of the acoustic wave can be radiated. Furthermore, the vibration source such as the actuator is unnecessary at the rear surface side of the bezel 101, thereby providing the image display apparatus 1 being excellent in terms of a design.

In the embodiment according to the present disclosure, the vibration position is set at the end face (point c) of the protrusion. If the vibration position is set to the point c, the vibration around the vibration position can be increased, and the sound pressure can be increased. In addition, the bezel 101 can be overall vibrated. In other words, a vibration tendency where the vibration position is set to the point c is in a middle between a vibration tendency where the vibration position is set to the point a and a vibration tendency where the vibration position is set to the point b.

Furthermore, by forming the protrusion, the mounting mechanism of the actuator can be offset from a diaphragm surface. For example, the holder holding the actuator can be prevented from protruding over the front surface side of the diaphragm surface.

2. Second Embodiment

Next, a second embodiment will be described. In the second embodiment, the same configurations as the first embodiment are denoted by the same reference numerals, and thus overlapped description thereof will be omitted.

Configuration Example of Image Display Apparatus

Figure 14:
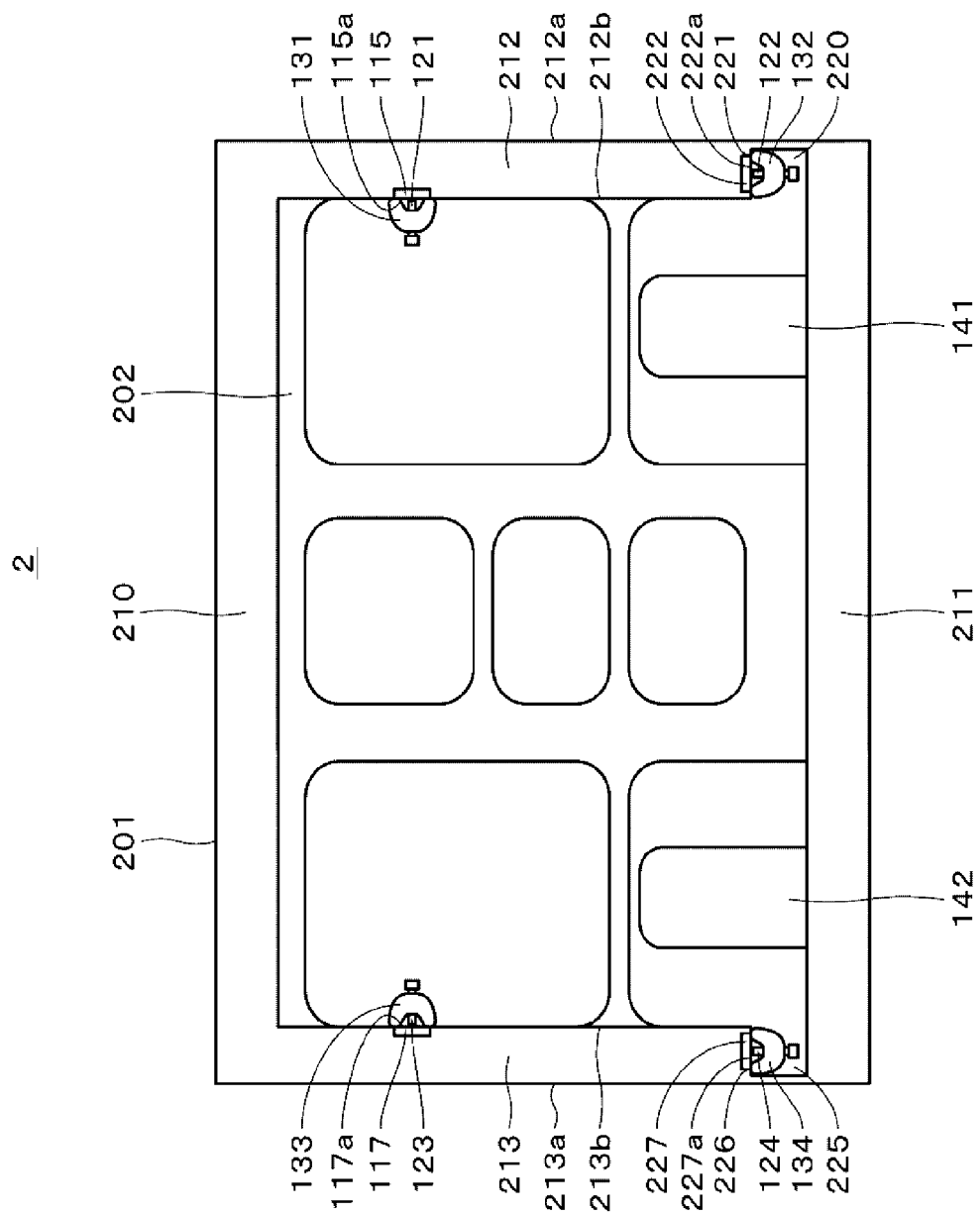
FIG. 14 A diagram for illustrating a configuration example of a part of an image display apparatus in a second embodiment.

FIG. 14 is a diagram for illustrating a configuration example of an image display apparatus 2 in a second embodiment viewed from a rear surface side. The configuration is substantially similar to that of the image display apparatus 1 excluding a part of the shape of the bezel and a position to which the actuators are mounted.

To a back chassis 202 of the image display apparatus 2, the L channel speaker 141 and the R channel speaker 142 are mounted similar to the image display apparatus 1.

The image display apparatus 2 includes a frame-like bezel 201 similar to the image display apparatus 1. The bezel 201 includes an upper side plate 210, a lower side plate 211, a right side plate 212, and a left side plate 213.

The right side plate 212 has an outer side surface 212a and an inner side surface 212b. The protrusion 115 is formed at a rear surface side of the right side plate 212. The contact surface of the actuator 121 is in contact with the end face 115a of the protrusion 115. The actuator 121 is mounted to the bezel 201 by the mounting mechanism 131. The actuator 121 is an example of the first vibrator. Details about the protrusion 115, the actuator 121 and the mounting mechanism 131 are described in the first embodiment, and the overlapped description is therefore omitted.

The left side plate 213 has an outer side surface 213a and an inner side surface 213b. The protrusion 117 is formed at a rear surface side of the left side plate 213. The contact surface of the actuator 123 is in contact with the end face 117a of the protrusion 117. The actuator 123 is mounted to the bezel 201 by the mounting mechanism 131. The actuator 123 may be an example of the first vibrator. Details about the protrusion 117, the actuator 123 and the mounting mechanism 133 are described in the first embodiment, and the overlapped description is therefore omitted.

Around a lower end of the right side plate 212, a concave portion 220 is formed. The concave portion 220 includes a side surface 221 substantially perpendicular to the inner side surface 212b. The side surface 221 is an example of the second predetermined plane. In addition, on a plate surface at the rear surface side of the right side plate 212, the protrusion 222 is formed. The protrusion 222 includes an end face 222a coplanar with the side surface 221 or parallel to the side surface 221. The contact surface of the actuator 122 is in contact with the end face 222a. The actuator 122 is mounted to the bezel 201 by the mounting mechanism 132 similar to the first embodiment. The actuator 122 is an example of the second vibrator.

Around a lower end of the left side plate 213, a concave portion 225 is formed. The concave portion 225 includes a side surface 226 substantially perpendicular to the inner side surface 213b. The side surface 226 may be an example of the second predetermined plane. In addition, on a plate surface at the rear surface side of the left side plate 213, the protrusion 227 is formed. The protrusion 227 includes an end face 227a coplanar with the side surface 226 or parallel to the side surface 226. The contact surface of the actuator 124 is in contact with the end face 227a. The actuator 124 is mounted to the bezel 201 by the mounting mechanism 134 similar to the first embodiment. The actuator 124 may be an example of the second vibrator.

"Sound Regeneration by Image Display Apparatus"

In the second embodiment, the actuator 122 and actuator 124 vibrate the bezel 201 from downward to upward. Here, if the diaphragm is vibrated by the actuator, a sound is immediately emitted from around the vibration position (vibration point). In contrast, at a place farthest from the vibration position, a little time is necessary to transmit the vibration from the vibration position. Accordingly, the acoustic wave radiated from the whole diaphragm has a wave surface having an angle dependent on a sound speed of a diaphragm material (a longitudinal wave speed propagated through a solid (diaphragm)).

Figure 15:
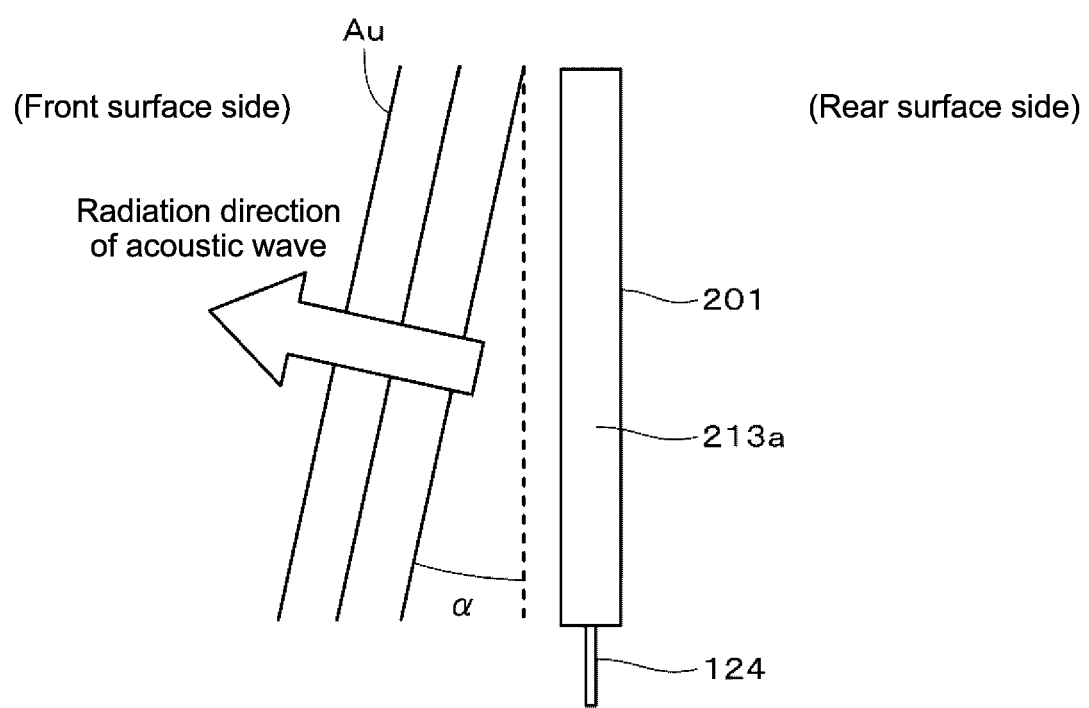
FIG. 15 A diagram for illustrating a radiation direction of an acoustic wave.

Referring to FIG. 15, a specific description is provided. FIG. 15 is a diagram of the image display apparatus 2 viewed from the outer side surface 213a of the left side plate 213. In FIG. 15, the drawing is partly simplified. For example, the bezel 201 made of an acrylic plate is vibrated by the actuator 124 etc. disposed at a lower part depending on the sound signal.

Figure 16:
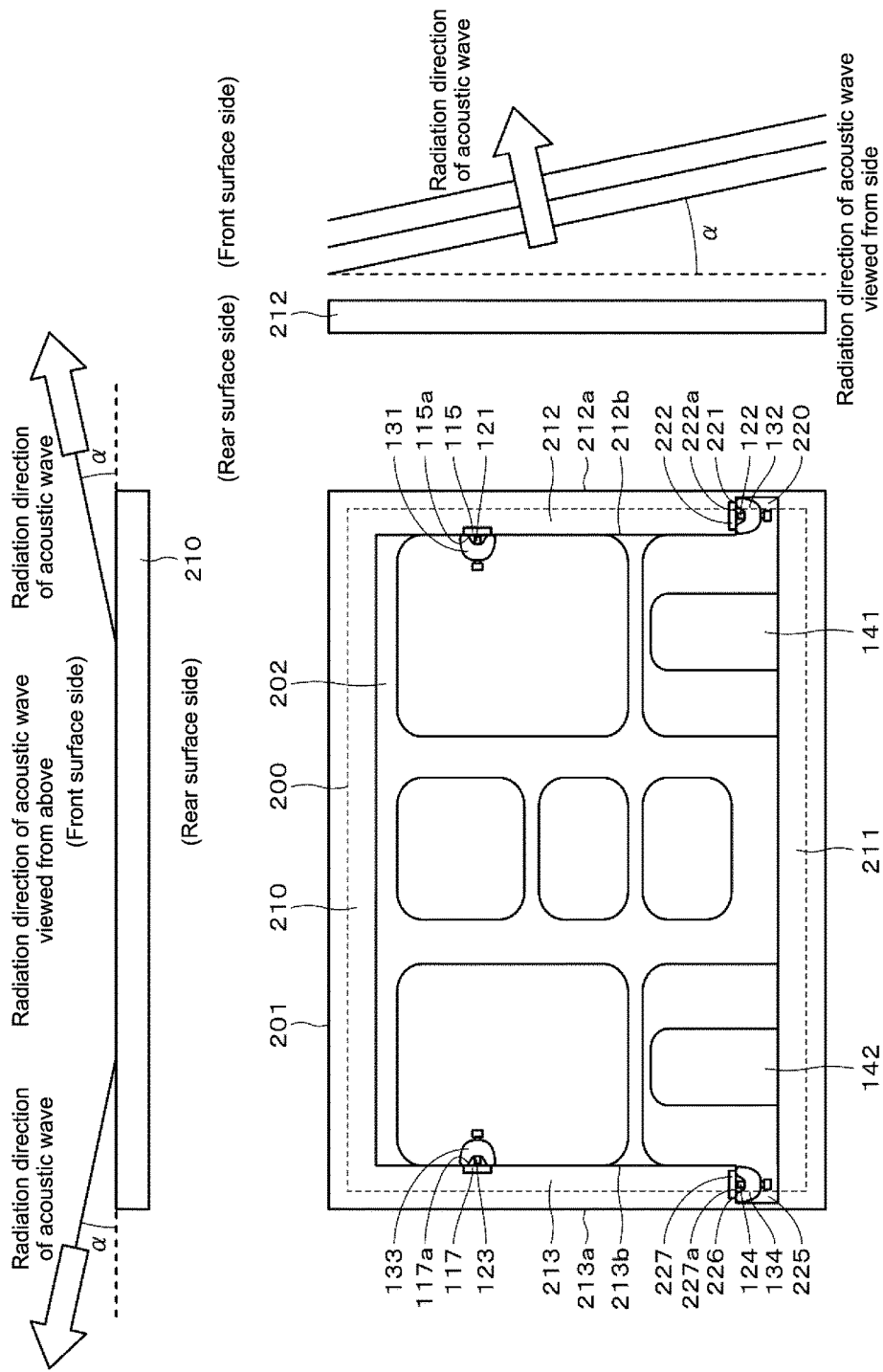
FIG. 16 A diagram for illustrating a radiation direction of an acoustic wave of an image display apparatus in a second embodiment.

In this case, a sound is immediately emitted from around the lower part of the bezel 201 around the vibration position. In contrast, a sound is emitted slightly later from around an upper part of the bezel 201 distant from the vibration position. Accordingly, as shown in FIG. 15, an acoustic wave surface Au of the sound emitted from the front surface side of the bezel 201 has an angle α to a plane shown in a dotted line in parallel with the front surface side of the bezel 201. The acoustic wave surface Au is propagated at the angle α toward upward, whereby the sound generated by the vibration of the bezel 201 is not confined, and is regenerated clearly for a listener. If the bezel 201 is made of, for example, an acrylic plate, the angle α is about 12 to 13 degrees. In FIG. 15 and FIG. 16 later, a radiation direction of the acoustic wave is schematically shown by arrows.

FIG. 16 is a diagram schematically showing the propagation of the acoustic wave of the sound regenerated by the vibration of the bezel 201. FIG. 16 shows the radiation direction of the acoustic wave viewed from an upper surface and a side surface of the bezel 201. As described above, the radiation direction of the acoustic wave directs from downward to upward depending on the vibrations by the actuator 122 and actuator 124.

On the other hand, a sound is immediately emitted from around the right side plate 212 and the left side plate 213 by the vibrations of the actuator 121 and the actuator 123. A sound is emitted later at a place distant from the vibration position (for example, around a center of the upper side plate 210 and a center of the lower side plate 211). In other words, the acoustic wave generated by the vibration of the actuator 121 and the vibration of the actuator 123 is propagated at an angle α in a horizontal direction.

The sound based on the vibrations of the actuator 121 and the actuator 123 provides the user (listener) with an acoustically widespread feeling. For example, if a movie is regenerated by the image display apparatus 2, the user can be provided with a realistic feeling. In addition, together with the clear voice regeneration based on the vibrations of the actuator 122 and the actuator 124, a high quality regenerated sound field is attained. Furthermore, in this embodiment, as the sound regenerated based on the vibration of the bezel 201 is a high band sound having a directionality, the user can have a more widespread feeling described above as compared with a low band sound having a small directionality.

Note that the bezel 201 may be configured such that a right corner RC of the bezel 201 is positioned in the vibration direction of the actuator 122. In addition, the bezel 201 may be configured such that a left corner LC of the bezel 201 is positioned in the vibration direction of the actuator 124.

Figure 17:
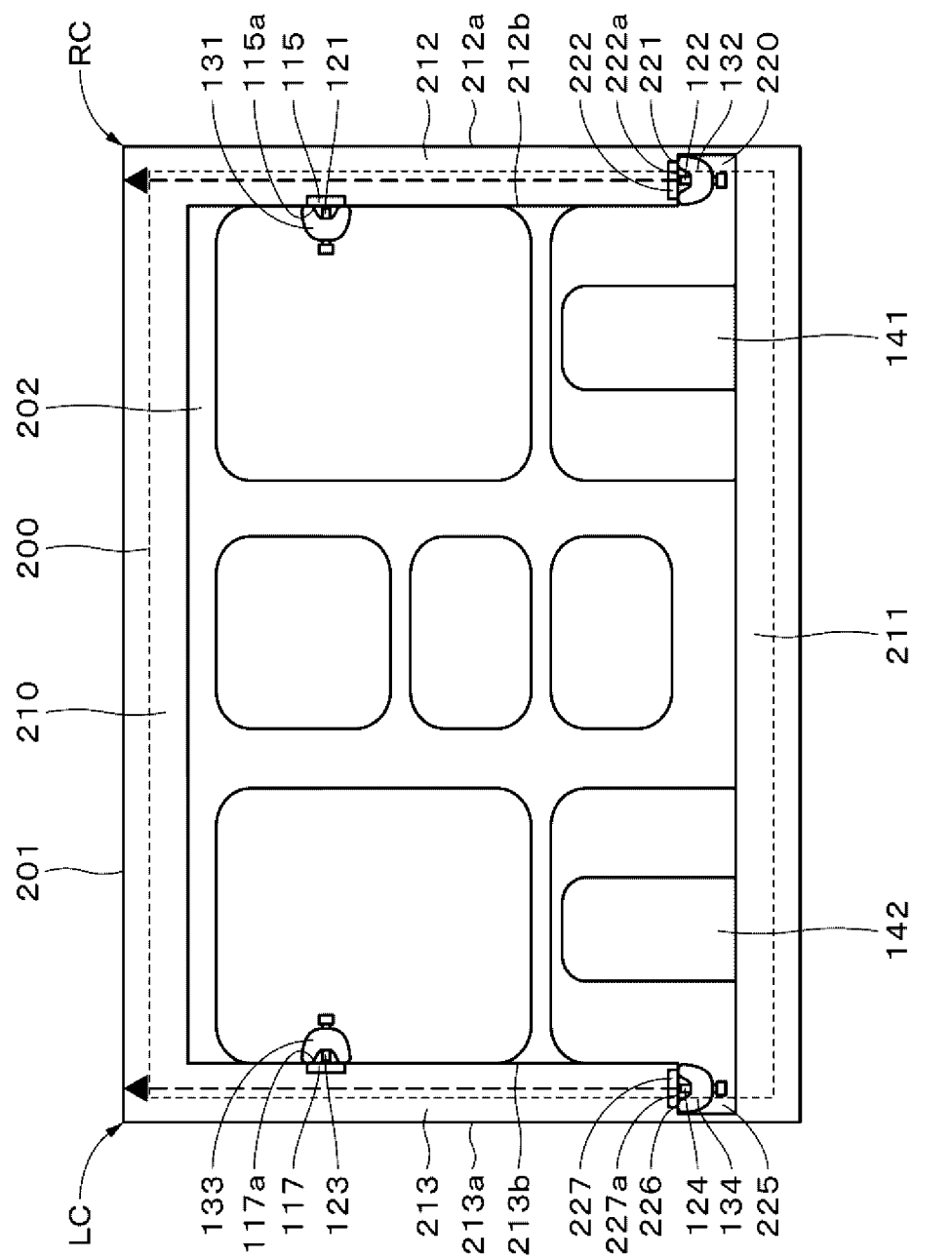
FIG. 17 A diagram for illustrating an example of a vibration direction of a predetermined actuator.

For example, as shown in FIG. 17, if the display panel 200 of the image display apparatus 2 is positioned at the vibration direction of the actuator 122, the sound generated from the vibration of the actuator 122 and the vibration of the right side plate 212 therefrom may be blocked by the display panel 200. The vibration direction of the actuator is defined by a line extending from the vibration position, for example. Similarly, the sound generated from the vibration of the actuator 124 and the vibration of the left side plate 213 therefrom may be blocked by the display panel 200.

Figure 18:
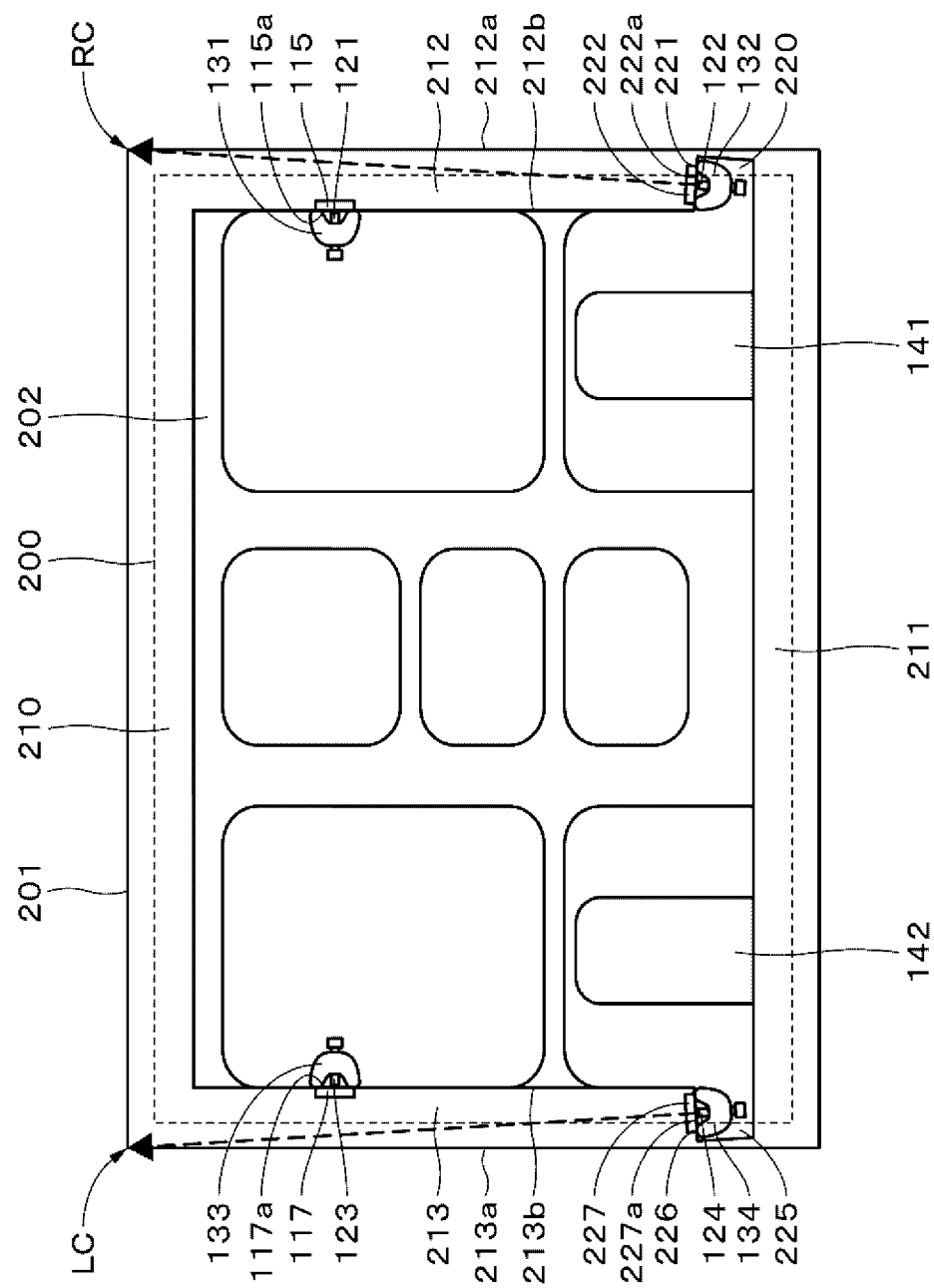
FIG. 18 A diagram for illustrating another example of a vibration direction of a predetermined actuator.

Then, as shown in FIG. 18, the actuator 122 is disposed by tilting the side surface 221 and the end face 222a such that the right corner RC of the bezel 201 is positioned in the vibration direction of the actuator 122. In addition, the actuator 124 is disposed by tilting the side surface 226 and the end face 227a such that the left corner RC of the bezel 201 is positioned in the vibration direction of the actuator 124. In this manner, the vibration of the actuator and the vibration of the bezel 201 based thereon are prevented from blocking by the display panel 200, thereby preventing the sound pressure from decreasing.

As described above, according to the first and second embodiments, there can be provided a sound output apparatus and an image display apparatus to which the sound output apparatus is applied that can attain both of a designability and a high level sound quality.

3. Application Embodiment

The sound output apparatus according to the present disclosure is applicable to a variety of apparatuses. Application embodiments will be described. Note that the contents of the present disclosure should not be limited to the application embodiments described below.

Application Embodiment 1

Figure 19:
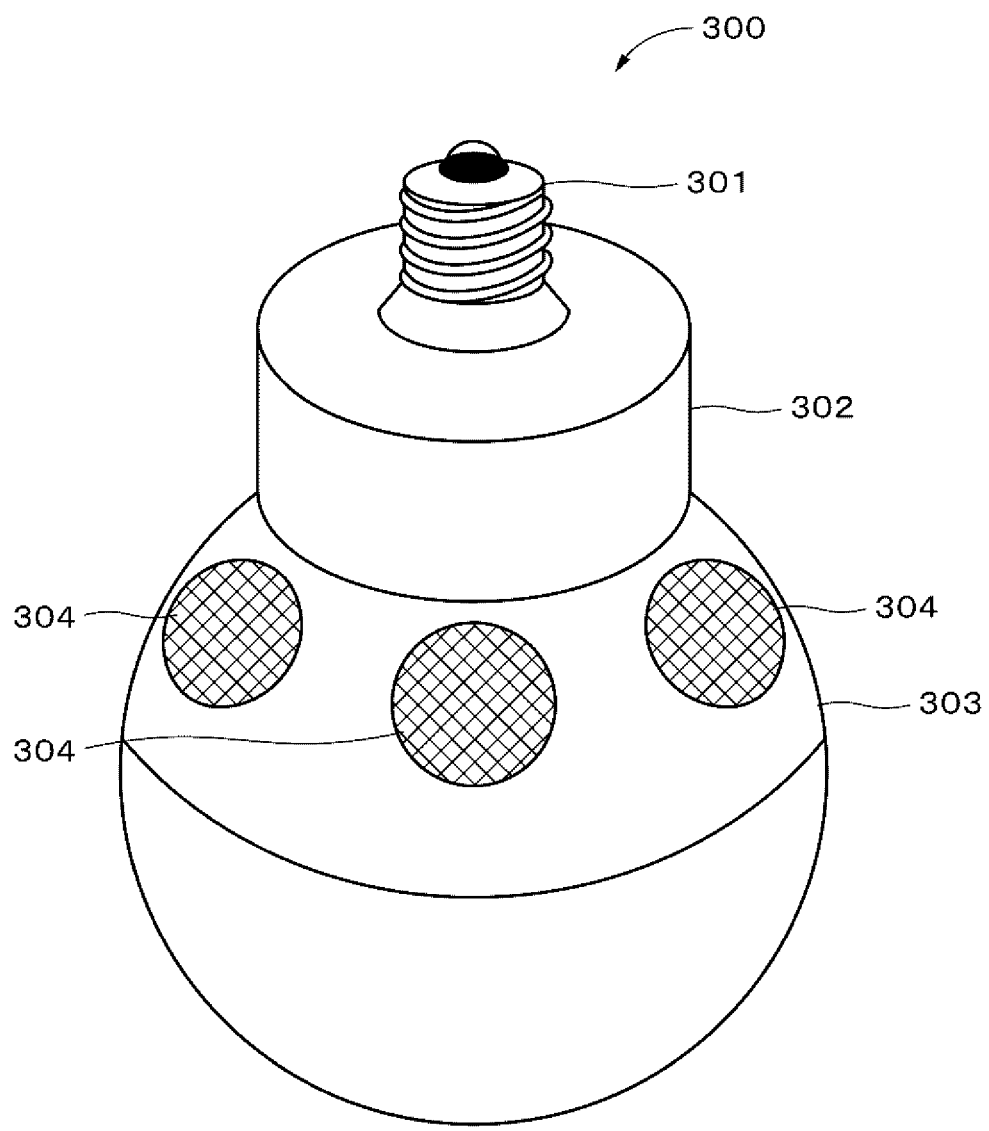
FIG. 19 A diagram for illustrating an example of an appearance of a lighting device in an application embodiment.

An application embodiment 1 is to illustrate that the sound output apparatus is applied to a lighting device. FIG. 19 is a diagram for illustrating an example of an appearance of the lighting device. A lighting device 300 has an appearance shape similar to that of an electric bulb, and includes an Edison screw 301 having a shape that is mechanically screwed and electrically connected to a bulb socket of existing lightening equipment, a base 302 formed at an end of the Edison screw 301, and a substantially glove-shaped housing unit 303 integrally formed with the base 302. In addition, the lighting device 300 includes meshed sound outputs 304 formed at a part of the housing unit 303.

The Edison screw 301 is made of, for example, an electrical conductive metal member. The base 302 is made of, for example, a resin molded member. The housing unit 303 may be made of glass or a resin molded member, and is desirably made of an acoustically excellent member.

Figure 20:
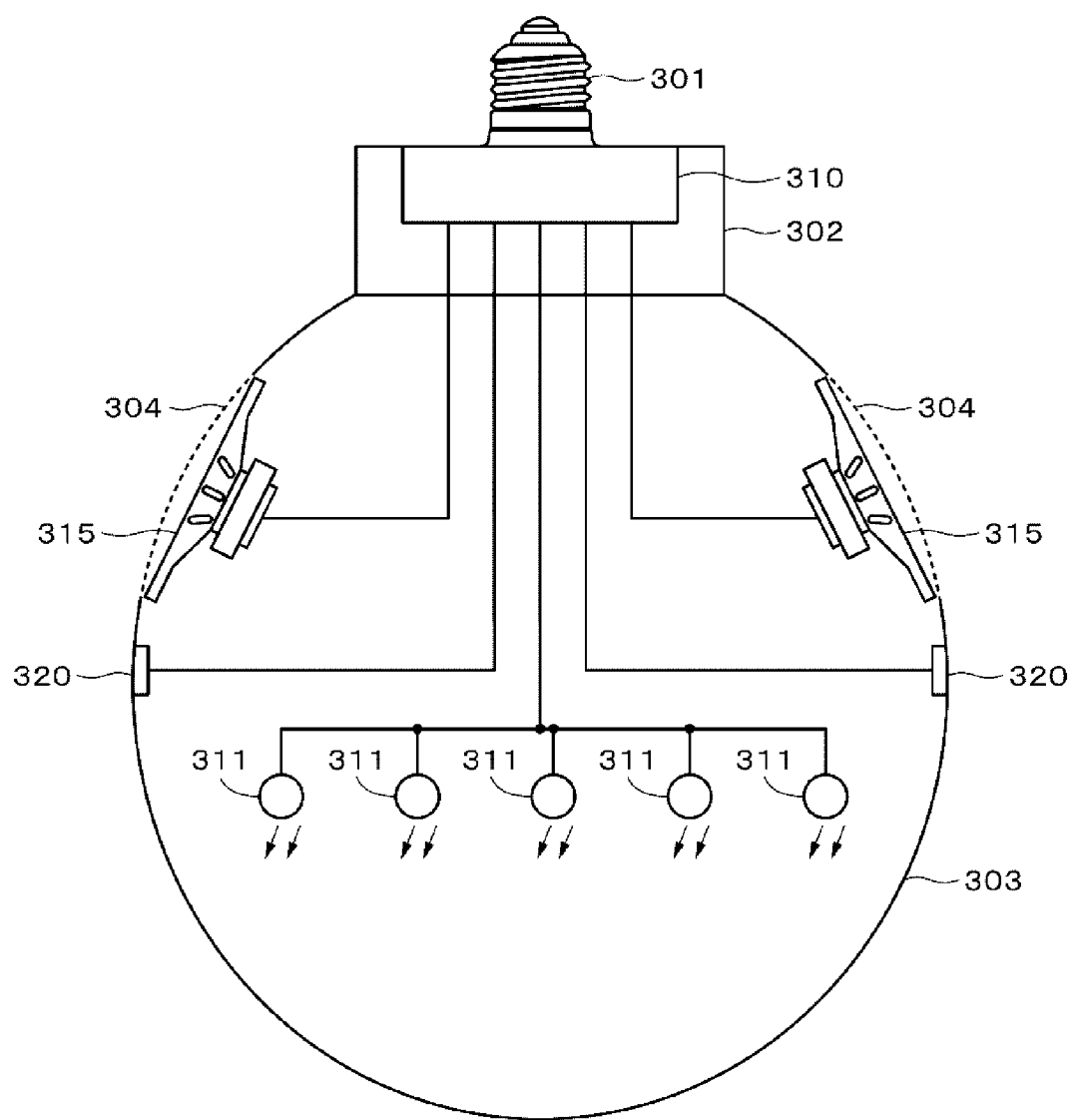
FIG. 20 A diagram for illustrating an example of an interior structure of a lighting device in an application embodiment.

FIG. 20 is a diagram for illustrating an example of an interior structure of the lighting device 300. A substrate 310 of the lighting device 300 is built in the base 302, for example. To the substrate 310, electricity and a sound signal can be supplied from an external device. Inside of the housing unit 303, a plurality of lamps 311 are arranged, each of which is an example of the light provision unit. As the lamps 311, for example, an LED (Light Emitting Diode), a filament, a fluorescent lamp, an organic EL (Electroluminescence) and the like are used. The lamps 311 are electrically connected to the substrate 310, and emit light depending on the electricity supplied via the substrate 310. A direction to which the lamps 311 emit light is set as a front surface side, and the Edison screw 301 is set as a rear surface side.

Inside of the sound outputs 304 of housing unit 303, a plurality of speakers 315 for outputting sounds is arranged. To each speaker 315, mid to low band sound signals are, for example, supplied via the substrate 310, and the voice based on the voice signal is regenerated from the speaker 315.

The actuators 320 are mounted to an inner periphery (an example of the predetermined plane) of the housing unit 303 at the rear surface side for the lamps 311. The actuator 320 is configured of, for example, a piezo actuator similar to the first embodiment. As the actuators 320 are positioned at the rear surface side of the lamps 311, the actuators 320 can keep low profile by the light of the lamps 311.

To the actuators 320, a high band sound signal is supplied via the substrate 310, for example. Depending on the high band sound signal supplied, the actuators 320 vibrate in a direction substantially perpendicular to the inner periphery. In response to the vibration of the actuators 320, the housing unit 303 vibrates, and the high band sound is regenerated. In this way, the sound output apparatus according to the present disclosure is applicable to the lighting device.

Application Embodiment 2

Figure 21:
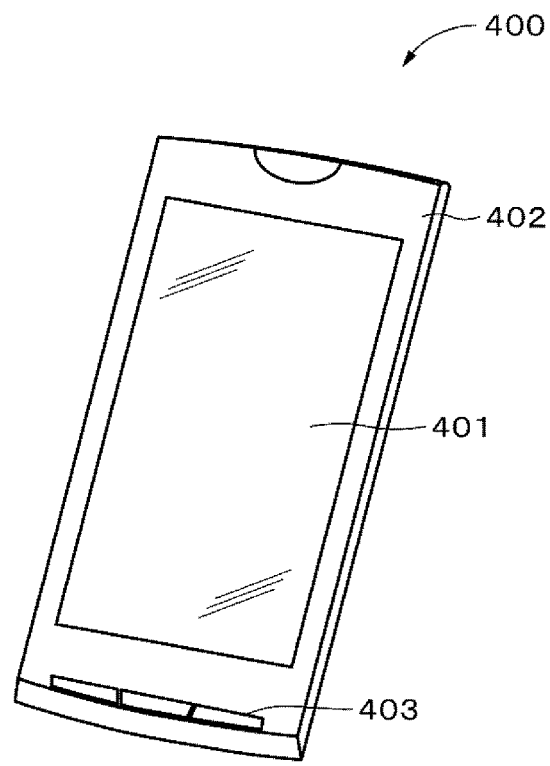
FIG. 21 A diagram for illustrating an example of an appearance of a mobile terminal in an application embodiment.

An application embodiment 2 is to illustrate that the sound output apparatus according to the present disclosure is applied to a mobile terminal. The mobile terminal is a smartphone, a mobile phone, a table computer, etc. FIG. 21 is a diagram for illustrating an example of an appearance of a mobile terminal 400. The mobile terminal 400 is configured of, for example, a display panel 401 that is an example of the light provision unit, a housing unit 402 mounted around the display panel 401, and an operation input unit 403 arranged on the housing unit 402. The display panel 401 is configured of, for example, a touch panel, and can display images. In addition, a variety of operation inputs is capable using the display panel 401.

At a rear surface side of the display panel 401, actuators (omitted in the figure) are positioned. The actuators are mounted to, for example, the housing unit 402 made of the light transmitting member. The actuators can be arranged by the manner described in the first or second embodiments. If the voice is regenerated using the mobile terminal 400, the actuators are vibrated, for example, based on the high band sound signal, thereby vibrating the housing unit 402. By vibrating the housing unit 402, the high band sound is regenerated.

With the mobile terminal 400 housed in a bag or a cloth, a music may be regenerated. In this case, it allows the housing unit 402 to be not vibrated. to be not vibrated. For example, if it is detected that the display panel 401 of the mobile terminal 400 is positioned substantially opposing a user's face and the voice is regenerated using the mobile terminal 400, the housing unit 402 may be vibrated.

Methods of detecting that the display panel 401 is positioned substantially opposing the user's face are described as follows: If the image capturing apparatus is applied to the mobile terminal 400 and the user's face is detected by the image capturing apparatus, it may be determined that the display panel 401 is positioned substantially opposing to the user's face. Alternatively, if a sensor is disposed at a predetermined place of the housing unit 402 and the sensor detects that the mobile terminal 400 is grasped by a user, it may be determined that the display panel 401 is positioned substantially opposing to the user's face.

Application Embodiment 3

Figure 22:
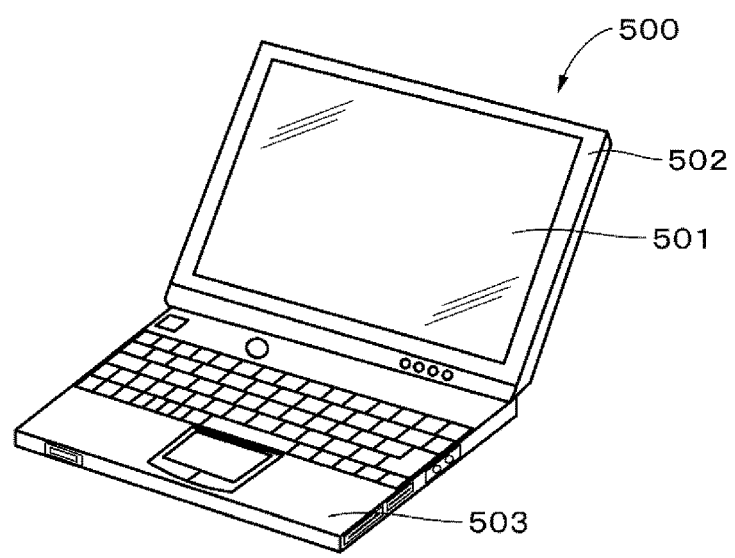
FIG. 22 A diagram for illustrating an example of an appearance of a personal computer in an application embodiment.

An application embodiment 3 is to illustrate that the sound output apparatus is applied to a stationary type personal computer. FIG. 22 is a diagram for illustrating an example of an appearance of a personal computer 500 in the application embodiment 3. The personal computer 500 includes a display panel 501, a frame-like plate 502 mounted around the display panel 501 and a base 503 having a drive such as a keyboard and a recording medium. The frame 502 is made of, for example, a light transmitting member.

At a rear surface of the display panel 501, actuators (omitted in the figure) are positioned. The actuators are mounted to, for example, the frame 502. The actuators can be arranged by the manner described in the first or second embodiments. If the voice is regenerated using the personal computer 500, the actuators are vibrated, for example, based on the high band sound signal, thereby vibrating the frame 502. By vibrating the frame 502, the high band sound is regenerated. Thus, the sound output apparatus according to the present disclosure is applicable to a wide variety of applications.

4. Alternative Embodiment

While the embodiments of the present disclosure have been described, the present disclosure is not limited to the above-described embodiments, and many modifications are possible based on the technical spirit of the present disclosure.

The numbers and the mounting positions of the actuators are not limited to the contents of the above-described embodiments. For example, the actuators may be mounted to around the center of the upper side plate or the lower side plate of the bezel. Then, the actuators provide the vibration in a direction substantially orthogonal to the inner side surface of the upper side plate and the inner side surface of the lower side plate. In this way, if the image display apparatus is made huge, the sound can be regenerated to the center position, and a sound image can be oriented to the center position.

Depending on attributes of the sound, a vibration amount of each actuator and the actuator to be vibrated may be changed. The attributes of the sound includes a category, a frequency property and a tempo. Furthermore, depending on the attributes of the image, a vibration amount of each actuator and the actuator to be vibrated may be changed. For example, in the second embodiment, if news is displayed on the display panel 200, only the actuator 122 and the actuator 124 are vibrated, thereby regenerating the sound clearly. If a movie is displayed on the display panel 200, all actuators are vibrated, thereby regenerating the sound clearly, providing an acoustic widespread feeling, and attaining a sound field having a realistic feeling.

In the above-described embodiments, the protrusion is formed at the rear surface side of the bezel. However, if the sound pressure in the predetermined level is secured and the mounting mechanism of the actuator can be small-sized, the protrusion is not necessarily formed.

The shape of the bezel is not limited to the definitely formed frame. For example, the bezel may be configured of a right side plate and a left side plate that are separated.

The present disclosure can be put into practice not only by the apparatus, but by a method, a program and a system. The program may be provided to the user via a network, or a portable memory such as an optical disk and a semiconductor memory.

The configurations and processing in the embodiments and alternative embodiment may be combined as appropriate, as long as no technical conflict is generated. The order of the processing in the illustrated flows can be changed, as long as no technical conflict is generated.

The present disclosure may be applicable to a so-called cloud system where illustrated processing is distributed and processed by a plurality of apparatuses. The present disclosure may be achieved in a system where processing illustrated in the embodiments and alternative embodiments is executed, i.e., an apparatus for executing at least a part of the processing illustrated.

The present disclosure may have the following configurations.

(1) A sound output apparatus, including:
 a diaphragm having a predetermined plane positioned at a rear surface side of a light provision unit, and
 a vibrator for providing vibration in a direction substantially orthogonal to the predetermined plane.

(2) The sound output apparatus according to (1) above, in which
 the light provision unit is a display panel for displaying an image.

(3) The sound output apparatus according to (1) or (2) above, in which
 a protrusion having an end face is formed at a rear surface side of the diaphragm, the end face being coplanar with the predetermined plane or parallel to the predetermined plane, and
 the vibrator is configured to provide vibration in a direction substantially orthogonal to the end face.

(4) The sound output apparatus according to any one of (1) to (3) above, including:
 a sound output unit formed at a rear surface side of the light provision unit, in which
 the diaphragm is configured such that the sound regenerated by the sound output unit is reflected to the front surface side of the light provision unit.

(5) The sound output apparatus according to (4) above, in which
 the vibrator is configured such that a first sound signal is supplied, and
 the sound output unit is configured such that a second sound signal having a band partially or totally different from a band of the first sound signal is supplied.

(6) The sound output apparatus according to (5) above, in which
 the vibrator is configured to be vibrated depending on the first sound signal supplied.

(7) The sound output apparatus according to any one of (1) to (6) above, in which
 the diaphragm is configured of a light transmitting member.

(8) The sound output apparatus according to any one of (1) to (7) above, including
 a plurality of the vibrators.

(9) The sound output apparatus according to any one of (3) to (9) above, in which
the vibrator is configured of a piezo actuator.
(10) The sound output apparatus according to (9) above, in which
the piezo actuator has a contact surface, and
the contact surface of the piezo actuator is in contact with the end face.
(11) A sound output method in a sound output apparatus, including:
arranging a predetermined plane of a diaphragm at a rear surface side of a light provision unit, and
providing vibration to a direction substantially orthogonal to the predetermined plane by a vibrator.
(12) An image display apparatus, including:
a display panel,
a diaphragm having a predetermined plane positioned at a rear surface side of a light provision unit, and
a vibrator for providing vibration in a direction substantially orthogonal to the predetermined plane.
(13) The image display apparatus according to (12) above, in which
the diaphragm is a frame surrounding a periphery of the display panel.
(14) The image display apparatus according to (12) or (13) above, in which
the diaphragm is configured of a light transmitting member.
(15) The image display apparatus according to any one of (12) to (14) above, in which
the predetermined plane includes a first predetermined plane and a second predetermined plane substantially orthogonal to the first predetermined plane, and
the vibrator includes a first vibrator that provides vibration to a direction substantially orthogonal to the first predetermined plane, and a second vibrator that provides vibration to a direction substantially orthogonal to the second predetermined plane.
(16) The image display apparatus according to (15) above, in which
the diaphragm includes a plurality of corners, and
the vibrator is configured such that at least one corner of a plurality of the corners is positioned at a vibration direction of the second vibrator.

DESCRIPTION OF SYMBOLS 1, 2 image display apparatus
100, 200 display panel
101, 201 bezel
112a inner side surface of right side plate
113a inner side surface of left side plate
115, 116, 117, 118 protrusion
115a, 116a, 117a, 118a end face of protrusion
121, 122, 123, 124 actuator
141, 142 speaker
221, 226 side surface of concave portion
222a, 227a end face of protrusion

What is claimed is:
1. A sound output apparatus, comprising:
a diaphragm, the diaphragm including:
a plurality of side plates,
wherein each side plate includes a front surface side, a rear surface side, an outer side surface, and an inner side surface,
wherein for each of the side plates the front surface side extends between the outer side surface and the inner side surface, and the rear surface side extends between the outer side surface and the inner side surface,
wherein a predetermined plane is formed by the inner side surface of a first side plate included in the plurality of side plates of the diaphragm,
wherein a light provision unit is adjacent the front surface side of the side plates, and
wherein the predetermined plane is not parallel to a plane of the light provision unit;
at least a first protrusion,
wherein the first protrusion extends from the rear surface side of the first side plate in a first direction,
wherein the first direction is away from the front surface side, and
wherein the first protrusion includes an end face defining a surface that is at least one of coplanar with or parallel to the predetermined plane; and
a vibrator, wherein
the vibrator is configured to provide vibration in a direction orthogonal to the plane of the end face of the protrusion.
2. The sound output apparatus according to claim 1, wherein
the light provision unit is a display panel for displaying an image.
3. The sound output apparatus according to claim 1, comprising:
a sound output unit formed at a rear surface side of the light provision unit, wherein
the diaphragm is configured such that the sound regenerated by the sound output unit is reflected to the front surface side of the light provision unit.
4. The sound output apparatus according to claim 3, wherein
the vibrator is configured such that a first sound signal is supplied, and
the sound output unit is configured such that a second sound signal having a band partially or totally different from a band of the first sound signal is supplied.
5. The sound output apparatus according to claim 4, wherein
the vibrator is configured to be vibrated depending on the first sound signal supplied.
6. The sound output apparatus according to claim 1, wherein
the diaphragm is configured of a light transmitting member.
7. The sound output apparatus according to claim 1, comprising:
a plurality of vibrators.
8. The sound output apparatus according to claim 1, wherein
the vibrator is configured of a piezo actuator.
9. The sound output apparatus according to claim 8, wherein
the piezo actuator has a contact surface, and
the contact surface of the piezo actuator is in contact with the end face.
10. The sound output apparatus of claim 1, wherein the protrusion extends from the rear surface side of the diaphragm.
11. The sound output apparatus according to claim 1, wherein the surface defined by the end face is coplanar with the predetermined plane.

12. The sound output apparatus according to claim 1, wherein in a side elevation the first protrusion has a triangular prism shape.

13. The sound output apparatus according to claim 1, further comprising:
- a second protrusion, wherein the second protrusion extends from the rear surface side of the first side plate in the first direction, and wherein the second protrusion includes an end face defining a surface that is at least one of coplanar with or parallel to the predetermined plane;
- a third protrusion, wherein the third protrusion extends from a rear surface side of a second side plate included in the plurality of side plates in the first direction, and wherein the third protrusion includes an end face defining a surface that is parallel to the predetermined plane; and
- a fourth protrusion, wherein the third protrusion extends from the rear surface side of the second side plate in the first direction, and wherein the fourth protrusion includes an end face defining a surface that is parallel to the predetermined plane.

14. The sound output apparatus of claim 1, wherein the first protrusion is integral with the diaphragm.

15. A sound output method in a sound output apparatus, comprising:
- arranging a predetermined plane of a diaphragm at a rear surface side of a light provision unit, wherein the predetermined plane is formed by an inner side surface of a side plate of the diaphragm, and wherein the predetermined plane is not parallel to a plane of the light provision unit; and
- providing vibration in a direction orthogonal to the predetermined plane by a vibrator, wherein
  - a protrusion extending from a rear surface side of the side plate of the diaphragm and having an end face is formed at a rear surface side of the diaphragm, the end face being coplanar with the predetermined plane or parallel to the predetermined plane, and
  - the vibrator is configured to provide vibration in a direction orthogonal to the end face.

16. An image display apparatus, comprising:
a display panel,
a diaphragm, the diaphragm including:
a plurality of side plates,
  wherein each side plate includes a front surface side, a rear surface side, an outer side surface, and an inner side surface,
  wherein for each of the side plates the front surface side extends between the outer side surface and the inner side surface, and the rear surface side extends between the outer side surface and the inner side surface,
  wherein a predetermined plane is formed by the inner side surface of a first side plate included in the plurality of side plates of the diaphragm,
  wherein a light provision unit is adjacent the front surface side of the side plates, and
  wherein the predetermined plane is not parallel to a plane of the display panel;
at least a first protrusion,
  wherein the first protrusion extends from the rear surface side of at least the first side plate in a first direction,
  wherein the first direction is away from the front surface side, and
  wherein the protrusion includes an end face defining a surface that is at least one of coplanar with or parallel to the predetermined plane, and
a vibrator for providing vibration in a direction orthogonal to the predetermined plane, wherein
  the vibrator is configured to provide vibration in a direction orthogonal to the plane of the end face of the protrusion.

17. The image display apparatus according to claim 16, wherein
the diaphragm is a frame surrounding a periphery of the display panel.

18. The image display apparatus according to claim 16, wherein
the diaphragm is configured of a light transmitting member.

19. The image display apparatus according to claim 16, wherein
the predetermined plane includes a first predetermined plane and a second predetermined plane, and
the vibrator includes a first vibrator that provides vibration to a direction
orthogonal to the first predetermined plane, and a second vibrator that provides vibration to a direction orthogonal to the second predetermined plane.

20. The image display apparatus according to claim 19, wherein
the diaphragm includes a plurality of corners, and
the vibrator is configured such that at least one corner of a plurality of the corners is positioned at a vibration direction of the second vibrator.

* * * * *